US008016283B2

(12) United States Patent
Ueda et al.

(10) Patent No.: US 8,016,283 B2
(45) Date of Patent: Sep. 13, 2011

(54) RECORDING SHEET FEEDER AND IMAGE FORMING APPARATUS PROVIDING EASY MAINTENANCE WITH SIMPLE STRUCTURE

(75) Inventors: Masayuki Ueda, Tokyo (JP); Hiroyuki Watase, Yokohama (JP); Ryo Takenaka, Yokohama (JP); Hiroshi Kajiyama, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 12/585,487

(22) Filed: Sep. 16, 2009

(65) Prior Publication Data

US 2010/0072691 A1    Mar. 25, 2010

(30) Foreign Application Priority Data

Sep. 25, 2008    (JP) .................................. 2008-246444

(51) Int. Cl.
*B65H 3/06* (2006.01)

(52) U.S. Cl. ......................... 271/117; 271/127; 271/160

(58) Field of Classification Search .................. 271/117, 271/118, 126, 127, 160
See application file for complete search history.

(56) References Cited

U.S. PATENT DOCUMENTS

| 5,244,191 | A | * | 9/1993 | Kanekura | .................. 271/10.11 |
| 6,955,349 | B2 | | 10/2005 | Watase | |
| 7,354,038 | B2 | | 4/2008 | Watase | |
| 7,549,630 | B2 | * | 6/2009 | Sugimura et al. | ............. 271/117 |
| 2003/0151191 | A1 | | 8/2003 | Watase | |
| 2005/0073088 | A1 | | 4/2005 | Watase | |
| 2007/0052164 | A1 | | 3/2007 | Watase et al. | |
| 2007/0057444 | A1 | | 3/2007 | Sagawa et al. | |
| 2007/0246879 | A1 | | 10/2007 | Sagawa et al. | |
| 2008/0001350 | A1 | | 1/2008 | Okamoto et al. | |
| 2008/0038039 | A1 | | 2/2008 | Watase et al. | |
| 2008/0085140 | A1 | | 4/2008 | Kajiyama et al. | |
| 2008/0106030 | A1 | | 5/2008 | Takenaka | |
| 2008/0203649 | A1 | | 8/2008 | Watase et al. | |

FOREIGN PATENT DOCUMENTS

| JP | 3-223030 | 10/1991 |
| JP | 8-34528 | 2/1996 |
| JP | 11-143139 | 5/1999 |
| JP | 3321716 | 6/2002 |
| JP | 2002-187630 | 7/2002 |
| JP | 2005-194082 | 7/2005 |
| JP | 2007-070005 | 3/2007 |

OTHER PUBLICATIONS

An English language abstract of Japanese Publication No. JP 6-183583, published Jul. 5, 1994.

* cited by examiner

*Primary Examiner* — Michael C McCullough
(74) *Attorney, Agent, or Firm* — Harness, Dickey & Pierce, P.L.C.

(57) ABSTRACT

In a recording sheet feeder, a recording sheet tray moving mechanism moves a recording sheet tray between an upper position, at which an uppermost recording sheet of a plurality of recording sheets loaded on the recording sheet tray contacts a feed roller, and a lower position, at which the uppermost recording sheet separates from the feed roller. A first eccentric cam and a second eccentric cam rotate to press down the recording sheet tray. A driving force switch member drives the recording sheet tray moving mechanism when a driver rotates in a first direction, and rotates a feed roller driving shaft mounted with the feed roller when the driver rotates in a second direction.

19 Claims, 11 Drawing Sheets

RECORDING SHEET FEEDER AND IMAGE FORMING APPARATUS PROVIDING EASY MAINTENANCE WITH SIMPLE STRUCTURE

PRIORITY STATEMENT

The present patent application claims priority from Japanese Patent Application No. 2008-246444, filed on Sep. 25, 2008, in the Japan Patent Office, which is hereby incorporated herein by reference in its entirety.

BACKGROUND OF THE INVENTION

1. Field of the Invention

Example embodiments generally relate to a recording sheet feeder and an image forming apparatus, and more particularly, to a recording sheet feeder for feeding a recording sheet, and an image forming apparatus including the recording sheet feeder.

2. Description of the Related Art

Related-art image forming apparatuses, such as copiers, facsimile machines, printers, or multifunction printers having at least one of copying, printing, scanning, and facsimile functions, typically form an image on a recording medium (e.g., a recording sheet) according to image data. Thus, for example, an image forming device forms an image according to the image data. The image is transferred onto a recording sheet fed by a recording sheet feeder toward the image forming device.

The recording sheet feeder typically includes a recording sheet tray for loading recording sheets, a recording sheet tray moving mechanism for lifting and lowering the recording sheet tray, and a feed roller for feeding the recording sheets loaded on the recording sheet tray toward the image forming device. As the height of the stack of recording sheets placed on the recording sheet tray decreases after the feed roller feeds successive recording sheets and the feed roller starts to separate from an uppermost recording sheet of the recording sheets placed on the recording sheet tray, the recording sheet tray moving mechanism lifts the recording sheet tray upward so that the uppermost recording sheet remains in contact with the feed roller.

The recording sheet feeder may include a motor and a lift lever that function as the recording sheet tray moving mechanism for lifting and lowering the recording sheet tray. The direction of rotation of the single motor is switched to lift the recording sheet tray via the lift lever when a sensor detects that the number of recording sheets placed on the recording sheet tray has decreased. Thereafter, the feed roller rotates and feeds the recording sheets placed on the recording sheet tray toward the image forming device.

With such a structure, the recording sheet tray is raised whenever the number of recording sheets placed on the recording sheet tray decreases. It is to be noted that the feed roller does not rotate while the recording sheet tray is being raised. When the rotation of the feed roller is interrupted frequently due to repeated lifting of the recording sheet tray, productivity of the image forming apparatus may deteriorate.

Alternatively, the recording sheet feeder may include a pressing plate which is lifted and lowered to press the recording sheets against the feed roller and two cams mounted axially on both ends of a feed roller driving shaft to lift and lower the pressing plate. As the feed roller is also mounted on the feed roller driving shaft, rotation of the feed roller is interlocked with driving of the cams to feed the recording sheets.

However, the interlocked rotation of the feed roller may restrict the length of the recording sheets to be fed. Moreover, a user needs to remove the two cams from the feed roller driving shaft to replace the feed roller with a new one, complicating maintenance.

SUMMARY

At least one embodiment may provide a recording sheet feeder that includes a recording sheet tray, a pressing member, a feed roller, a feed roller driving shaft, a recording sheet tray moving mechanism, a driver, a driving force transmission member, a controller, and a driving force switch member.

The recording sheet tray loads a plurality of recording sheets. The pressing member presses up the recording sheet tray. The feed roller feeds the plurality of recording sheets loaded on the recording sheet tray. The feed roller driving shaft is fixedly mounted axially with the feed roller on one end of the feed roller driving shaft. The recording sheet tray moving mechanism moves the recording sheet tray between an upper position, at which an uppermost recording sheet of the plurality of recording sheets loaded on the recording sheet tray contacts the feed roller, and a lower position, at which the uppermost recording sheet separates from the feed roller. The recording sheet tray moving mechanism includes a first eccentric cam and a second eccentric cam. The first eccentric cam is rotatably mounted axially on another end of the feed roller driving shaft to rotate to press down the recording sheet tray. The second eccentric cam is provided coaxial with the feed roller driving shaft to rotate to press down the recording sheet tray. The driver generates a driving force to drive one of the feed roller and the recording sheet tray moving mechanism. The driving force transmission member transmits the driving force generated by the driver from the first eccentric cam to the second eccentric cam. The controller rotates the driver in one of a first direction and a second direction different from the first direction. The driving force switch member drives the recording sheet tray moving mechanism when the driver rotates in the first direction, and rotates the feed roller driving shaft when the driver rotates in the second direction.

At least one embodiment may provide an image forming apparatus that includes a recording sheet feeder including a recording sheet tray, a pressing member, a feed roller, a feed roller driving shaft, a recording sheet tray moving mechanism, a driver, a driving force transmission member, a controller, and a driving force switch member.

The recording sheet tray loads a plurality of recording sheets. The pressing member presses up the recording sheet tray. The feed roller feeds the plurality of recording sheets loaded on the recording sheet tray. The feed roller driving shaft is fixedly mounted axially with the feed roller on one end of the feed roller driving shaft. The recording sheet tray moving mechanism moves the recording sheet tray between an upper position, at which an uppermost recording sheet of the plurality of recording sheets loaded on the recording sheet tray contacts the feed roller, and a lower position, at which the uppermost recording sheet separates from the feed roller. The recording sheet tray moving mechanism includes a first eccentric cam and a second eccentric cam. The first eccentric cam is rotatably mounted axially on another end of the feed roller driving shaft to rotate to press down the recording sheet tray. The second eccentric cam is provided coaxial with the feed roller driving shaft to rotate to press down the recording sheet tray. The driver generates a driving force to drive one of the feed roller and the recording sheet tray moving mechanism. The driving force transmission member transmits the driving force generated by the driver from the first eccentric cam to the second eccentric cam. The controller rotates the driver in one of a first direction and a second direction different from the first direction. The driving force switch member drives the recording sheet tray moving mechanism when the driver rotates in the first direction, and rotates the feed roller driving shaft when the driver rotates in the second direction.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
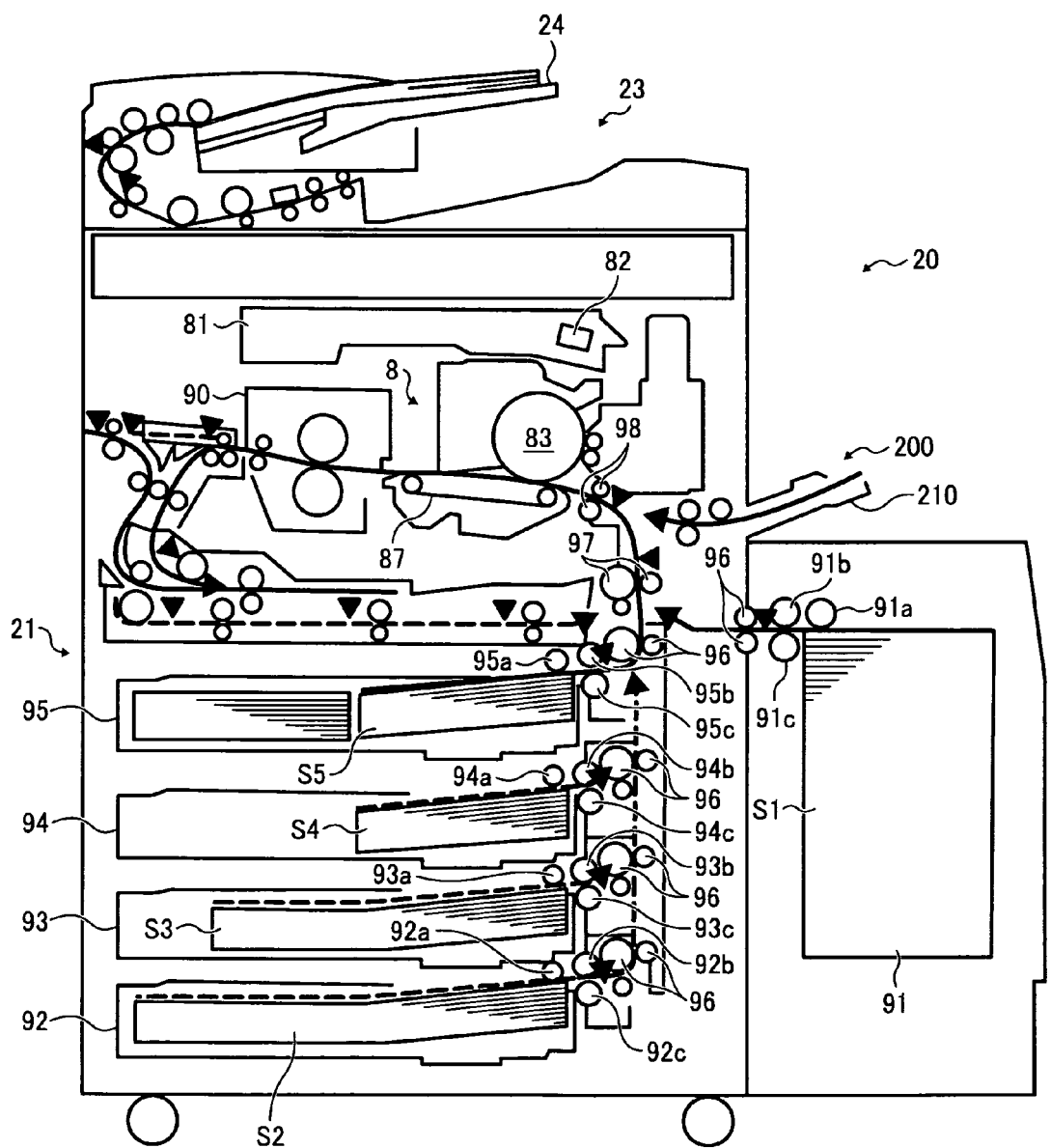
FIG. 1 is a schematic view of an image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 20 according to an example embodiment is explained.

FIG. 1 is a schematic view of the image forming apparatus 20. As illustrated in FIG. 1, the image forming apparatus 20 includes a body 21 and/or an auto document feeder (ADF) 23.

The ADF 23 includes an original tray 24.

The body 21 includes an image reader 81, a writer 82, an image forming device 8, a fixing device 90, paper trays 91, 92, 93, 94, and 95, pickup rollers 91a, 92a, 93a, 94a, and 95a, feed rollers 91b, 92b, 93b, 94b, and 95b, reverse rollers 91c, 92c, 93c, 94c, and 95c, relay roller pairs 96 and 97, a registration roller pair 98, and/or a recording sheet feeder 200.

The image forming device 8 includes a photoconductive drum 83 and/or a transfer belt 87.

The recording sheet feeder 200 includes a recording sheet tray 210.

Figure 2:
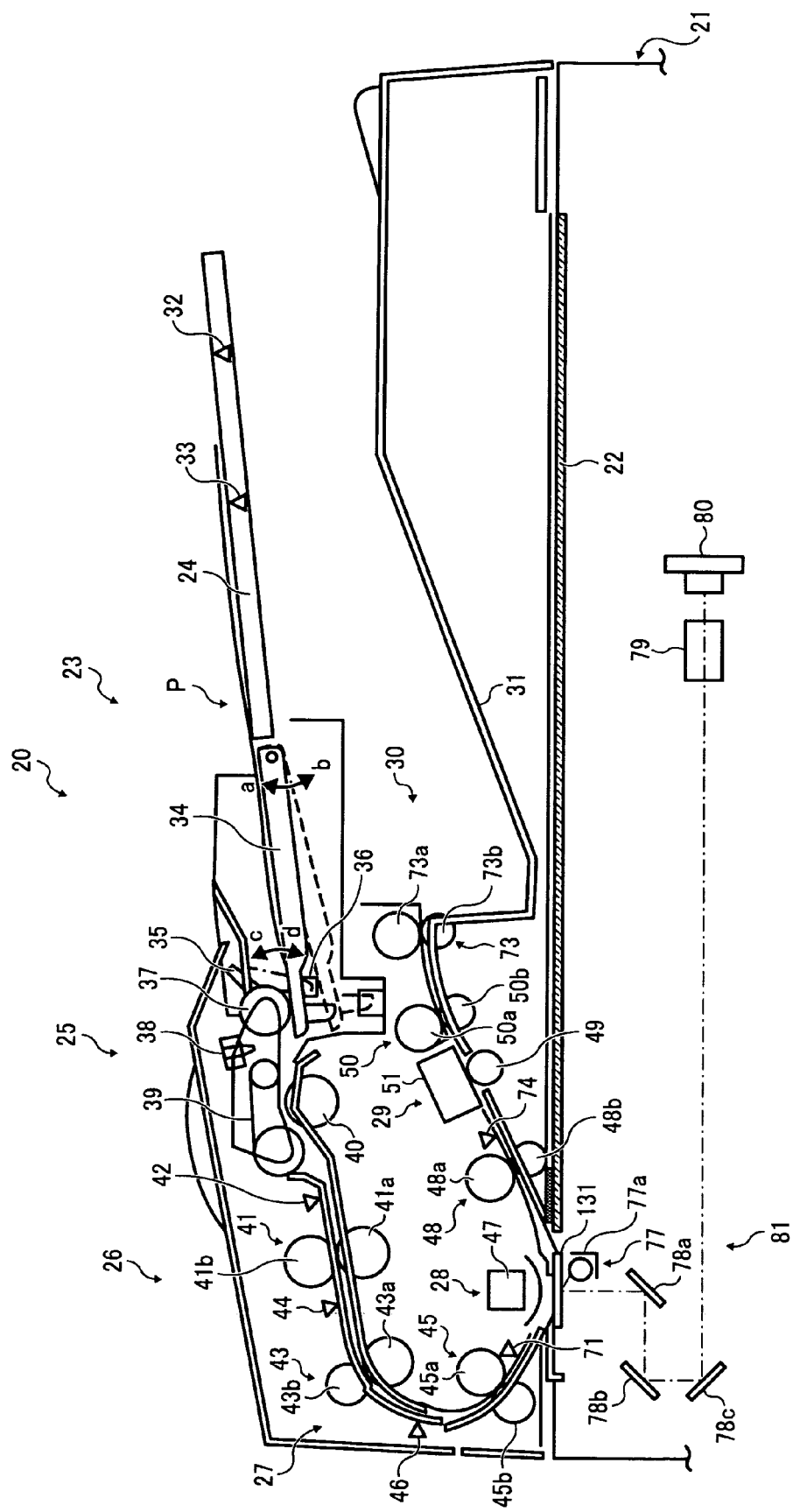
FIG. 2 is a schematic view (according to an example embodiment) of an auto document feeder (ADF) included in the image forming apparatus shown in FIG. 1.

FIG. 2 is a schematic view of the ADF 23. As illustrated in FIG. 2, the image forming apparatus 20 further includes an exposure glass 22 and/or a slit glass 131.

The image reader 81 includes a light source 77, reflection mirrors 78a, 78b, and 78c, a converging lens 79, and/or an image sensor 80. The light source 77 includes a reflector 77a.

The ADF 23 further includes a separate-feed portion 25, a registration portion 26, a turning portion 27, a first read-convey portion 28, a second read-convey portion 29, an output portion 30, a stack portion 31, original length sensors 32 and 33, a movable original tray 34, a set feeler 35, an original set sensor 36, a pickup roller 37, and/or a lifted tray sensor 38.

The separate-feed portion 25 includes a feeding belt 39 and/or a reverse roller 40.

The registration portion 26 includes a registration roller pair 41, a registration sensor 42, and/or original width sensors 44. The registration roller pair 41 includes a driving roller 41a and/or a driven roller 41b.

The turning portion 27 includes an intermediate roller pair 43, an entrance roller pair 45, an entrance sensor 46, and/or a registration sensor 71. The intermediate roller pair 43 includes a driving roller 43a and/or a driven roller 43b. The entrance roller pair 45 includes a driving roller 45a and/or a driven roller 45b.

The first read-convey portion 28 includes a background board 47 and/or an exit roller pair 48. The exit roller pair 48 includes a driving roller 48a and/or a driven roller 48b.

The second read-convey portion 29 includes a second reading roller 49, an exit roller pair 50, an image sensor 51, and/or an output sensor 74. The exit roller pair 50 includes a driving roller 50a and/or a driven roller 50b.

The output portion 30 includes an output roller pair 73. The output roller pair 73 includes a driving roller 73a and/or a driven roller 73b.

Figure 3:
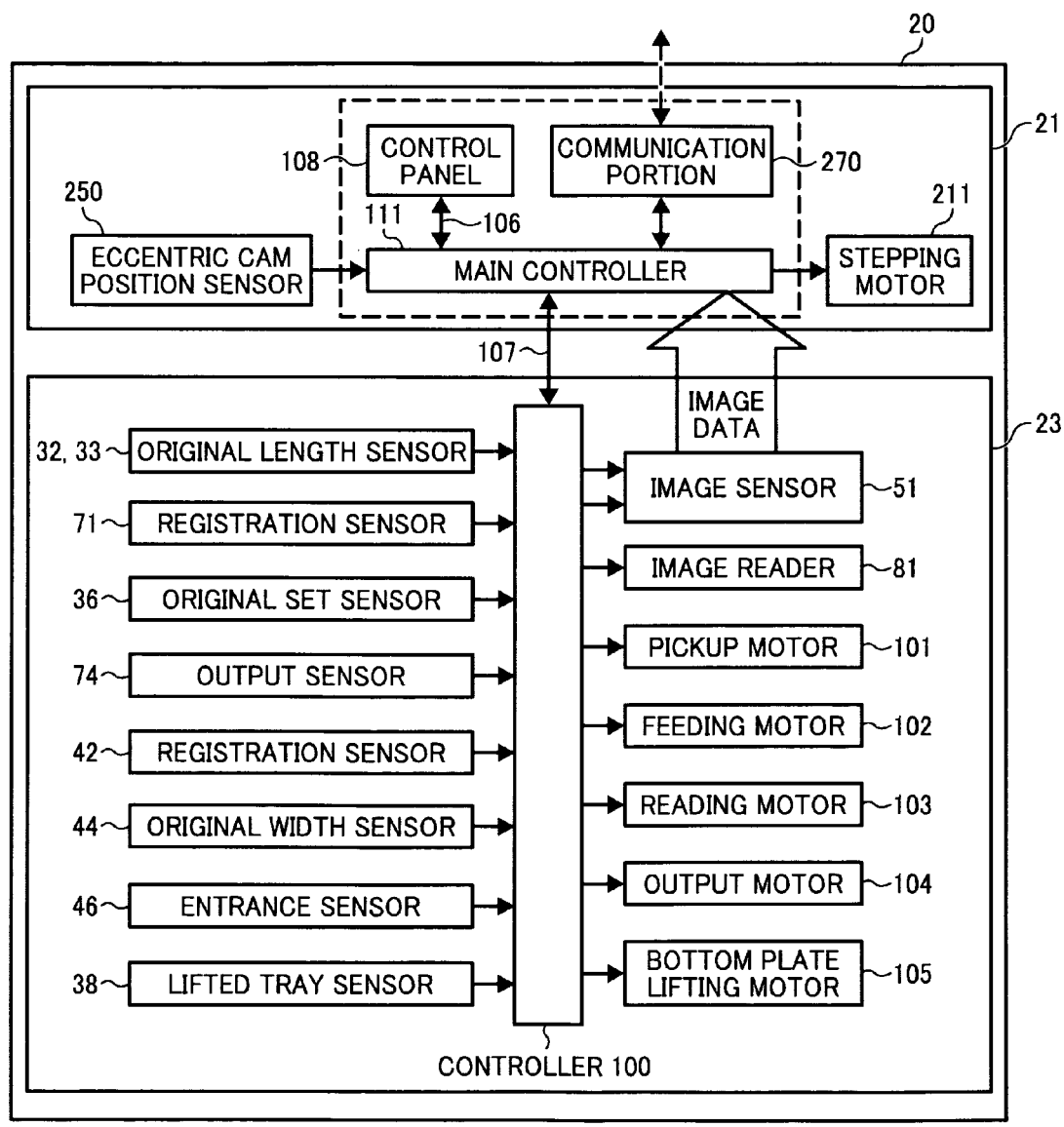
FIG. 3 is a block diagram (according to an example embodiment) of the image forming apparatus shown in FIG. 1.

FIG. 3 is a block diagram of the image forming apparatus 20. As illustrated in FIG. 3, the image forming apparatus 20 further includes an I/F (interface) 106, an I/F 107, a control panel 108, a main controller 111, a stepping motor 211, an eccentric cam position sensor 250, and/or a communication portion 270.

The ADF 23 further includes a controller 100, a pickup motor 101, a feeding motor 102, a reading motor 103, an output motor 104, and/or a bottom plate lifting motor 105.

As illustrated in FIG. 1, the image forming apparatus 20 can be a copier, a facsimile machine, a printer, a multifunction printer having at least one of copying, printing, scanning, plotter, and facsimile functions, or the like. According to this example embodiment of the present invention, the image forming apparatus 20 functions as a copier for forming an image on a recording medium.

As illustrated in FIG. 2, the exposure glass 22 is provided on an upper surface of the body 21. The slit glass 131 has an area smaller than an area of the exposure glass 22, and is provided on the upper surface of the body 21 at a position adjacent to the exposure glass 22. The slit glass 131 is called an exposure glass for a sheet-through document, feeder or simply called an exposure glass.

The ADF 23 is provided above the body 21 and serves as an auto document feeder for feeding original documents P automatically. The ADF 23 is lifted and lowered with respect to the exposure glass 22 via a hinge mechanism so that the ADF 23 is opened and closed with respect to the exposure glass 22. The image reader 81 provided below the exposure glass 22 reads an image on an original document P placed and stopped on the exposure glass 22 through the exposure glass 22. Alternatively, the image reader 81 provided below the exposure glass 22 reads an image on an original document P fed by the ADF 23 through the slit glass 131.

In the ADF 23, a plurality of original documents P is placed on the original tray 24 with an image on a front side of each of the plurality of original documents P facing up. The separate-feed portion 25 separates an uppermost original document P from other original documents P placed on the original tray 24 to feed the separated original document P toward the registration portion 26. The fed original document P is contacted and aligned by the registration portion 26 to correct skew of the original document P. The registration portion 26 feeds the aligned original document P toward the turning portion 27. The turning portion 27 reverses and feeds the original document P toward the slit glass 131 provided below the first read-convey portion 28 so that the image on the front side of the original document P faces down on the slit glass 131. The first read-convey portion 28 is disposed opposite the slit glass 131 to cause the image reader 81 provided below the exposure glass 22 to read the image on the front side of the original document P through the slit glass 131, and feeds the original document P toward the second read-convey portion 29. The second read-convey portion 29 reads an image on a back side of the original document P, and feeds the original document P toward the output portion 30. The output portion 30 discharges the original document P onto the stack portion 31. The stack portion 31 receives and holds the original document P discharged by the output portion 30.

As illustrated in FIG. 3, the ADF 23 includes drivers for performing various driving operations including feeding and conveying operations, such as the pickup motor 101, the feeding motor 102, the reading motor 103, the output motor 104, and the bottom plate lifting motor 105. The controller 100 controls operations of the ADF 23.

As illustrated in FIG. 2, the original length sensors 32 and 33 are provided on the original tray 24, and detect length of the plurality of original documents P placed on the original tray 24 in an original document conveyance direction. The original length sensors 32 and 33 may be reflection sensors or actuator sensors capable of detecting even a single original document P. The original length sensors 32 and 33 generate a detection signal based on the detected length of the plurality of original documents P, and send the detection signal to the controller 100 depicted in FIG. 3. Therefore, the original length sensors 32 and 33 are provided on the original tray 24 to detect at least orientation of the plurality of original documents P having an identical size, that is, portrait orientation or landscape orientation.

The movable original tray 34 is disposed adjacent to a leading edge of the original tray 24 and downstream from the original tray 24 in the original document conveyance direction. The bottom plate lifting motor 105 depicted in FIG. 3 lifts and lowers the movable original tray 34 in directions a and b, respectively.

A side guide is provided on the original tray 24 to position the plurality of original documents P in a width direction (e.g., a direction perpendicular to the original document conveyance direction).

The set feeler 35 and the original set sensor 36 are provided near the movable original tray 34. When the plurality of original documents P is set on the movable original tray 34, the set feeler 35 moves from a position shown in a dotted line to a position shown in a solid line.

When no original document P is set on the movable original tray 34, the original set sensor 36 detects the set feeler 35 disposed at the position shown in the dotted line. By contrast, when one or more original documents P are set on the movable original tray 34, the original set sensor 36 does not detect the set feeler 35 because the original documents P push up the set feeler 35 to the position shown in the solid line. When the original set sensor 36 does not detect the set feeler 35, the original set sensor 36 sends a signal to the controller 100 depicted in FIG. 3. The controller 100 sends the signal to the main controller 111 provided in the body 21 via the I/F 107 depicted in FIG. 3. Accordingly, the body 21 becomes ready to read an image on the original documents P.

When the controller 100 judges that the plurality of original documents P is set on the movable original tray 34 according to the signal sent from the original set sensor 36, the controller 100 rotates the bottom plate lifting motor 105 to lift a bottom plate of the movable original tray 34 so that an uppermost original document P of the plurality of original documents P contacts the pickup roller 37.

A driving force generated by the pickup motor 101 depicted in FIG. 3 is transmitted to the pickup roller 37 via a cam mechanism so that the pickup motor 101 and the cam mechanism lift and lower the pickup roller 37 in directions c and d. The pickup roller 37 is lifted in the direction c to a position at which the pickup roller 37 separates from an upper surface of the uppermost original document P. The pickup roller 37 is lowered in the direction d to a position at which the pickup roller 37 contacts the upper surface of the uppermost original document P.

The lifted tray sensor 38 is provided above the movable original tray 34. When the movable original tray 34 is lifted in the direction a to lift the pickup roller 37 in the direction c, the lifted tray sensor 38 detects the pickup roller 37 lifted to an upper limit.

As illustrated in FIG. 3, when a user presses a start key on the control panel 108 provided in the body 21, the control panel 108 sends an original feeding signal to the main controller 111 via the I/F 106. The main controller 111 sends the original feeding signal to the controller 100 via the I/F 107. The controller 100 rotates the feeding motor 102 forward to rotate the pickup roller 37 depicted in FIG. 2 so that the pickup roller 37 picks up and feeds several original documents P, preferably a single original document P, placed on the original tray 24 depicted in FIG. 2.

Thus, as illustrated in FIG. 2, the pickup roller 37 picks up and feeds an uppermost original document P toward the separate-feed portion 25 including the feeding belt 39 and the reverse roller 40 provided downstream from the pickup roller 37 in the original document conveyance direction.

In the separate-feed portion 25, the feeding motor 102 depicted in FIG. 3 rotates forward to rotate the feeding belt 39 clockwise in FIG. 2 in the original document conveyance direction. When the feeding motor 102 rotates forward, a torque limiter provided inside the reverse roller 40 rotates the reverse roller 40 clockwise in FIG. 2 in a direction opposite to the original document conveyance direction. Thus, the feeding belt 39 and the reverse roller 40 separate an uppermost original document P from other original documents P below the uppermost original document P to feed the uppermost original document P, even when the pickup roller 37 picks up several original documents P.

For example, the reverse roller 40 contacts the feeding belt 39 by applying a reference pressure to the feeding belt 39. When the reverse roller 40 contacts the feeding belt 39 or when the reverse roller 40 and the feeding belt 39 nip a single original document P, a rotation force of the feeding belt 39 rotates the reverse roller 40 counterclockwise in FIG. 2. When two or more original documents P accidentally enter a nip portion formed between the reverse roller 40 and the feeding belt 39, the rotation force of the feeding belt 39 is smaller than a given torque of the torque limiter provided inside the reverse roller 40. Accordingly, the reverse roller 40 rotates clockwise in FIG. 2 in a default direction of rotation to push back the original documents P other than the uppermost original document P to prevent the plurality of original documents P from being fed toward the registration portion 26. Thus, the feeding belt 39 feeds the uppermost original document P separated from other original documents P by the feeding belt 39 and the reverse roller 40 toward the registration portion 26.

In the registration portion 26, the registration roller pair 41 is provided downstream from the feeding belt 39 in the original document conveyance direction, and is rotated by the feeding, motor 102 depicted in FIG. 3.

The registration roller pair 41 corrects skew of the uppermost original document P sent from the separate-feed portion 25 including the feeding belt 39 and the reverse roller 40, and feeds the uppermost original document P toward the turning portion 27.

When the controller 100 depicted in FIG. 3 starts feeding the plurality of original documents P set on the movable original tray 34, the feeding motor 102 depicted in FIG. 3 is stopped and therefore the registration roller pair 41 is also stopped. The registration sensor 42 provided upstream from the registration roller pair 41 in the original document conveyance direction detects a leading edge of the original document P sent from the separate-feed portion 25, and then the original document P is contacted by the registration roller pair 41.

When the registration sensor 42 detects the leading edge of the original document P and sends a detection signal to the controller 100, the controller 100 drives the feeding motor 102 to rotate the feeding belt 39 to convey the original document P for a given distance after the registration sensor 42 detects the leading edge of the original document P. Accordingly, the original document P contacts the registration roller pair 41 in a state in which the original document P is bent for a given amount.

The controller 100 rotates the pickup motor 101 depicted in FIG. 3 before stopping the feeding motor 102, so as to separate the pickup roller 37 from the upper surface of the original document P. Accordingly, a conveying force (e.g., a feeding force) of the feeding belt 39 sends the original document P toward the registration roller pair 41. Thus, the leading edge of the original document P enters a nip portion formed between the driving roller 41a and the driven roller 41b of the registration roller pair 41 so that the registration roller pair 41 corrects skew of the original document P.

After the correction of skew of the original document P, the controller 100 rotates the feeding motor 102 backward. The feeding motor 102 rotates the registration roller pair 41 to feed the original document P toward the intermediate roller pair 43 of the turning portion 27. The intermediate roller pair 43 includes the driving roller 43a and the driven roller 43b, and is driven by the feeding motor 102.

When the controller 100 rotates the feeding motor 102 backward, a driving force generated by the feeding motor 102 is transmitted to the registration roller pair 41 and the intermediate roller pair 43, and is not transmitted to the pickup roller 37 and the feeding belt 39.

A plurality of original width sensors 44 is provided downstream from the registration roller pair 41 in the original document conveyance direction. The plurality of original width sensors 44 is arranged from a front to a rear of the ADF 23 in FIG. 2 in a depth direction corresponding to a width direction of the original document P perpendicular to the original document conveyance direction to detect size (e.g., width) of the original document P in the width direction of the original document P perpendicular to the original document conveyance direction. The original width sensors 44 send a detection signal to the controller 100. The controller 100 judges the size of the original document P based on the detection signal sent from the original width sensors 44.

The controller 100 judges length of the original document P in the original document conveyance direction based on the detection signal sent from the registration sensor 42. For example, the controller 100 counts pulse signals generated by the feeding motor 102 after the registration sensor 42 is turned on when the registration sensor 42 detects the leading edge of the original document P until the registration sensor 42 is turned off when the registration sensor 42 detects a trailing edge of the original document P.

The entrance roller pair 45 is provided downstream from the intermediate roller pair 43 in the original document conveyance direction at an entrance to the first read-convey portion 28. The entrance roller pair 45 includes the driving roller 45a and the driven roller 45b, and is driven by the reading motor 103 depicted in FIG. 3.

The white background board 47 is provided above the slit glass 131, and has a U-like shape in cross-section to guide the original document P conveyed over the slit glass 131.

The exit roller pair 48 is provided downstream from the background board 47 in the original document conveyance direction, and includes the driving roller 48a and the driven roller 48b.

The second reading roller 49 is provided downstream from the exit roller pair 48 in the original document conveyance direction, and includes a driving roller. The exit roller pair 50 is provided downstream from the second reading roller 49 in the original document conveyance direction, and, includes the driving roller 50a and the driven roller 50b. The reading motor 103 depicted in FIG. 3 drives the entrance roller pair 45, the exit roller pair 48, the second reading roller 49, and the exit roller pair 50.

The image sensor 51 is provided above the second reading roller 49, and includes a CCD (charge-coupled device), a CIS (contact image sensor), or the like. The image sensor 51 reads an image on the back side of the original document P.

The entrance sensor 46 is provided downstream from the intermediate roller pair 43 in the original document conveyance direction. When the entrance sensor 46 detects the leading edge of the original document P, the entrance sensor 46 sends a signal to the controller 100.

When the controller 100 receives the signal sent from the entrance sensor 46, the controller 100 starts decreasing a rotation speed of the feeding motor 102 depicted in FIG. 3. Simultaneously, the controller 100 rotates the reading motor 103 depicted in FIG. 3 forward and connects the intermediate roller pair 43 to drivers including the reading motor 103 to drive the entrance roller pair 45, the exit roller pair 48, and the second reading roller 49. Thus, before the leading edge of the original document P enters a nip portion formed between the driving roller 45a and the driven roller 45b of the entrance roller pair 45, the controller 100 adjusts a conveying speed for conveying the original document P to be equivalent to a read-convey speed for reading an image on the original document P.

When the registration roller pair 41 and the intermediate roller pair 43 are driven to convey the original document P from the registration portion 26 to the turning portion 27, the controller 100 sets a conveying speed at which the registration portion 26 conveys the original document P to be faster than a conveying speed at which the first read-convey portion 28 conveys the original document P, so as to shorten a time period needed for the original document P to reach the slit glass 131 and a distance between the original document P and a next original document P.

The registration sensor 71 is provided downstream from the entrance roller pair 45 in the original document conveyance direction. The registration sensor 71 detects the leading edge of the original document P, and sends a detection signal to the controller 100.

When the controller 100 receives the detection signal sent from the registration sensor 71, the controller 100 decreases the rotation speed of the feeding motor 102 depicted in FIG. 3 while the original document P is conveyed for a given distance, so that the original document P stops temporarily before the slit glass 131. Simultaneously, the controller 100 sends a registration stop signal to the main controller 111 via the I/F 107 depicted in FIG. 3.

Further, when the controller 100 receives a reading start signal from the main controller 111, the controller 100 increases a rotation speed of the reading motor 103 depicted in FIG. 3 so that the conveying speed of the intermediate roller pair 43 and the entrance roller pair 45 for conveying the original document P increases to a given speed before the leading edge of the original document P stopped before the slit glass 131 according to the detection signal sent from the registration sensor 71 reaches the slit glass 131. Thus, the intermediate roller pair 43 and the entrance roller pair 45 convey the original document P at the increased speed.

When the controller 100 receives the reading start signal before the leading edge of the original document P reaches the registration sensor 71, an image on the original document P is read without being stopped before the slit glass 131. In other words, the original document P is not stopped according to the detection signal sent from the registration sensor 71, and therefore an image on the original document P is read while the original document P is conveyed and read at the read-convey speed.

At a time calculated by pulse signals generated by the reading motor 103 as a time at which the leading edge of the original document P reaches the slit glass 131, the controller 100 sends a gate signal indicating a valid image region on a surface of the original document P in a sub-scanning direction to the main controller 111. The controller 100 continues sending the gate signal until the trailing edge of the original document P passes through the slit glass 131.

In a one-sided mode for reading an image on the front side of the original document P, the original document P, which has passed through the slit glass 131, is conveyed to the output portion 30 through the second read-convey portion 29. When the output sensor 74 detects the leading edge of the original document P, the controller 100 rotates the output motor 104 depicted in FIG. 3 forward to rotate the driving roller 73a of the output roller pair 73 counterclockwise in FIG. 2.

After the output sensor 74 detects the leading edge of the original document P, the controller 100 starts counting pulse signals generated by the output motor 104. Immediately before the trailing edge of the original document P passes through a nip portion formed between the driving roller 73a and the driven roller 73b of the output roller pair 73, the controller 100 decreases a driving speed (e.g., a rotation speed) of the output motor 104 to prevent the original document P fed by the output roller pair 73 from dropping off the stack portion 31.

In a two-sided mode for reading an image on the front side and the back side of the original document P, the controller 100 starts counting pulse signals generated by the reading motor 103 after the output sensor 74 detects the leading edge of the original document P. Simultaneously, at the time calculated by the pulse signals generated by the reading motor 103 as the time at which the leading edge of the original document P reaches the slit glass 131, the controller 100 sends the gate signal indicating the valid image region on the surface of the original document P in the sub-scanning direction to the image sensor 51. The controller 100 continues sending the gate signal until the trailing edge of the original document P passes through the image sensor 51.

The white, second reading roller 49 serves as a white reference portion read by the image sensor 51 to generate shading data. The second reading roller 49 is provided below the image sensor 51 to suppress separation of the original document P from the image sensor 51 while the image sensor 51 reads an image on the original document P.

As illustrated in FIG. 2, the image reader 81 is provided inside the body 21 of the image forming apparatus 20. In the image reader 81, the light source 77 has a cylindrical shape and includes a xenon lamp or a halogen lamp. Alternatively, the light source 77 may include a fluorescent lamp. The light source 77 includes the reflector 77a to provide a desired illumination distribution on the surface of the original document P. The image sensor 80 includes a CCD. The image reader 81, the slit glass 131, and a frame serve as an image reading device.

In the image reader 81, the light source 77 emits light onto the original document P through the slit glass 131 or the exposure glass 22. The light reflected by the original document P is deflected by the reflection mirrors 78a, 78b, and 78c, and enters the converging lens 79. The converging lens 79 forms the light into an image in the image sensor 80 to generate image data. The image data is sent to the writer 82 depicted in FIG. 1. The writer 82 emits a laser beam onto the photoconductive drum 83 depicted in FIG. 1 according to the image data.

Figure 4:
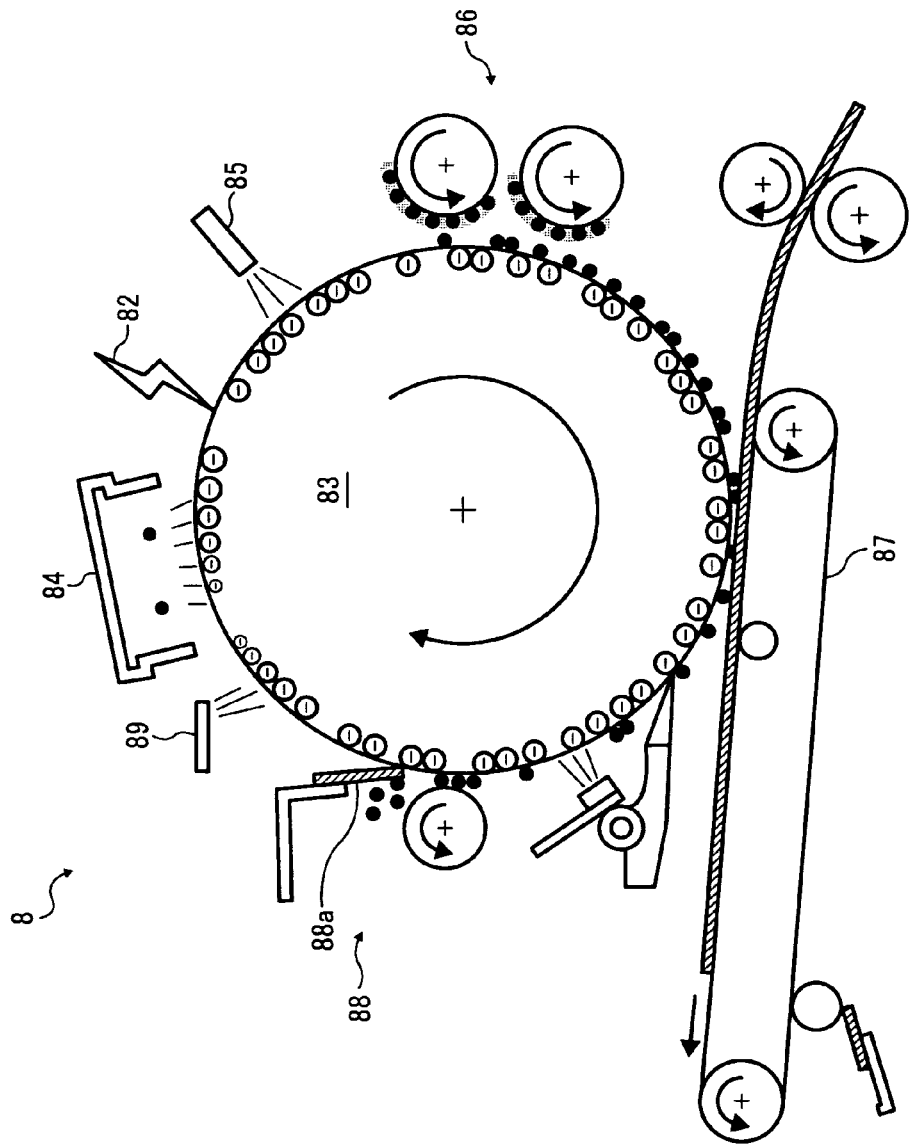
FIG. 4 is a sectional view (according to an example embodiment) of an image forming device included in the image forming apparatus shown in FIG. 1.

Referring to FIG. 4, the following describes the image forming device 8 of the image forming apparatus 20 depicted in FIG. 1. FIG. 4 is a sectional view of the image forming device 8. As illustrated in FIG. 4, the image forming device 8 further includes a charger 84, a potential sensor 85, a development device 86, a cleaner 88, and/or a discharger 89. The cleaner 88 includes a cleaning blade 88a.

The charger 84, the writer 82, the potential sensor 85, the development device 86, the transfer belt 87, the cleaner 88, and the discharger 89 surround the photoconductive drum 83. The writer 82 includes a laser diode. The discharger 89 includes an LED (light emitting diode). The charger 84 charges a surface of the photoconductive drum 83 to have a uniform potential by controlling corona discharge having a positive charge with a grid in the dark.

The writer 82 emits a laser beam onto the surface of the photoconductive drum 83 charged to have the uniform potential according to the image data sent from the image reader 81 depicted in FIG. 1. The laser beam removes a negative charge from the surface of the photoconductive drum 83 to form an electrostatic latent image on the surface of the photoconductive drum 83. The potential sensor 85 measures the potential of the surface of the photoconductive drum 83 to perform correction by process control. Thus, the image forming apparatus 20 may serve as a laser beam printer.

The development device 86 causes negatively charged toner particles to adhere to the electrostatic latent image formed on the surface of the photoconductive drum 83 to make the electrostatic latent image visible as a toner image. The transfer belt 87 applied with a positive bias transfers the negatively charged toner image onto a recording sheet serving as a recording medium while conveying the recording sheet.

The cleaning blade 88a of the cleaner 88 scrapes residual toner particles not transferred onto the recording sheet conveyed by the transfer belt 87 and remaining on the surface of the photoconductive drum 83 from the surface of the photoconductive drum 83. The LED of the discharger 89 is turned on to remove residual charge remaining on the surface of the photoconductive drum 83. Thus, the image forming device 8 becomes ready to form another image on a next recording sheet.

The recording sheet bearing the toner image formed by the above-described series of operations for forming the toner image on the recording sheet is conveyed to the fixing device 90 depicted in FIG. 1. The fixing device 90 applies heat and pressure to the recording sheet bearing the toner image to fix the toner image on the recording sheet. Thus, the image forming apparatus 20 may serve as an electrophotographic copier.

As illustrated in FIG. 1, the paper trays 91 to 95 are provided inside the body 21, and load recording sheets S1 to S5 having different sizes, respectively. The pickup roller 91a, 92a, 93a, 94a, or 95a picks up and feeds a recording sheet S1, S2, S3, S4, or S5 contained in the paper tray 91, 92, 93, 94, or 95, respectively. Thereafter, the feed roller 91b, 92b, 93b, 94b, or 95b rotating in a recording sheet conveyance direction and the reverse roller 91c, 92c, 93c, 94c, or 95c rotating in a direction opposite to the recording sheet conveyance direction to slide on a lowermost recording sheet S1, S2, S3, S4, or S5 separate an uppermost recording sheet S1, S2, S3, S4, or S5 from other recording sheets S1, S2, S3, S4, or S5, respectively. The separated uppermost recording sheet S1, S2, S3, S4, or S5 is conveyed toward the registration roller pair 98 via the relay roller pairs 96 and 97. The registration roller pair 98 feeds the recording sheet S1, S2, S3, S4, or S5 toward a conveyance path (e.g., a nip portion) formed between the photoconductive drum 83 and the transfer belt 87 at a proper time.

As described above, the image forming apparatus 20 may serve as the electrophotographic copier or the laser beam printer. Further, the image forming apparatus 20 may include the communication portion 270 depicted in FIG. 3 for communicating with a public communication network, for example, to serve as a facsimile machine.

Figure 5:
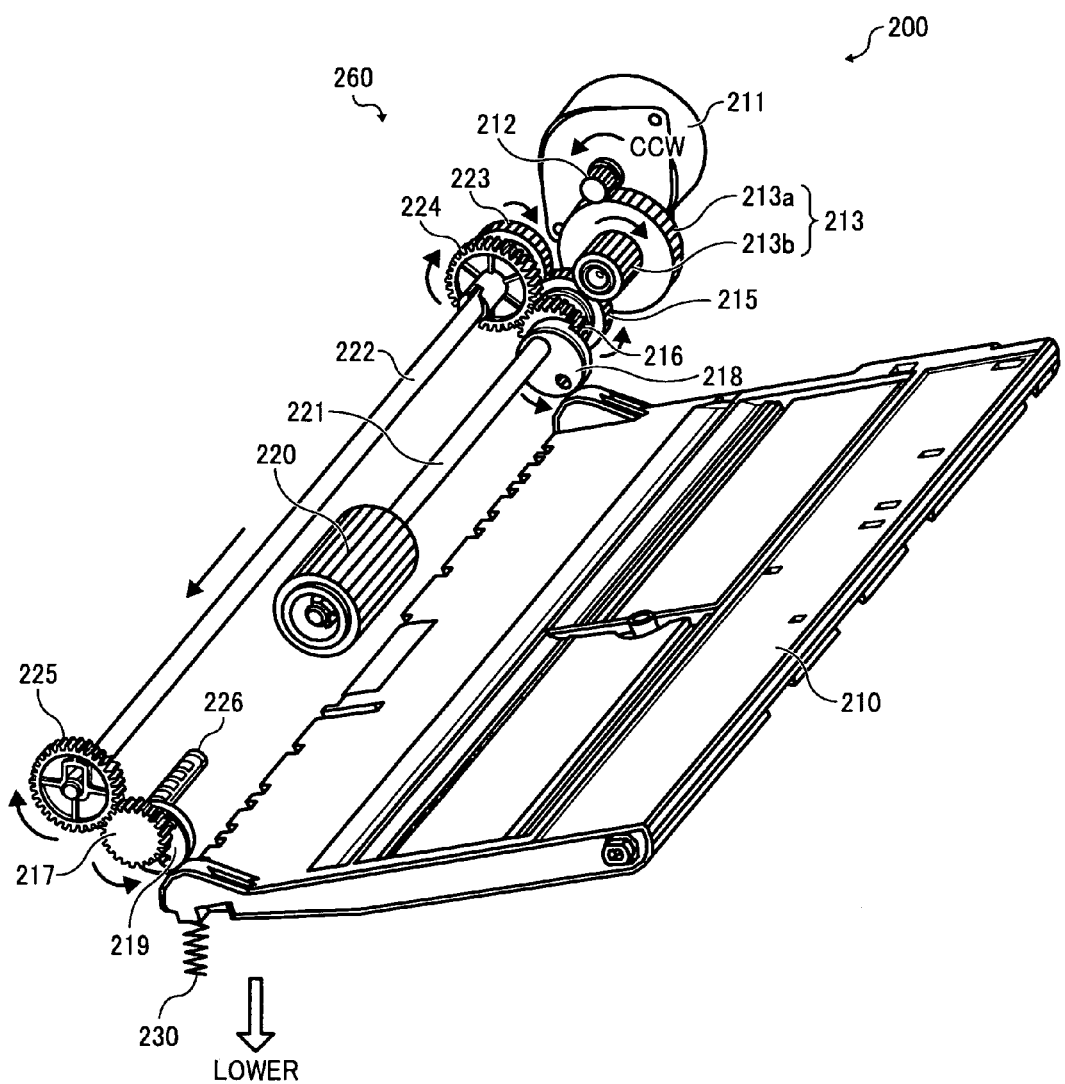
FIG. 5 is a perspective view (according to an example embodiment) of a recording sheet feeder included in the image forming apparatus shown in FIG. 1 when a recording sheet tray included in the recording sheet feeder is lowered.
Figure 6:
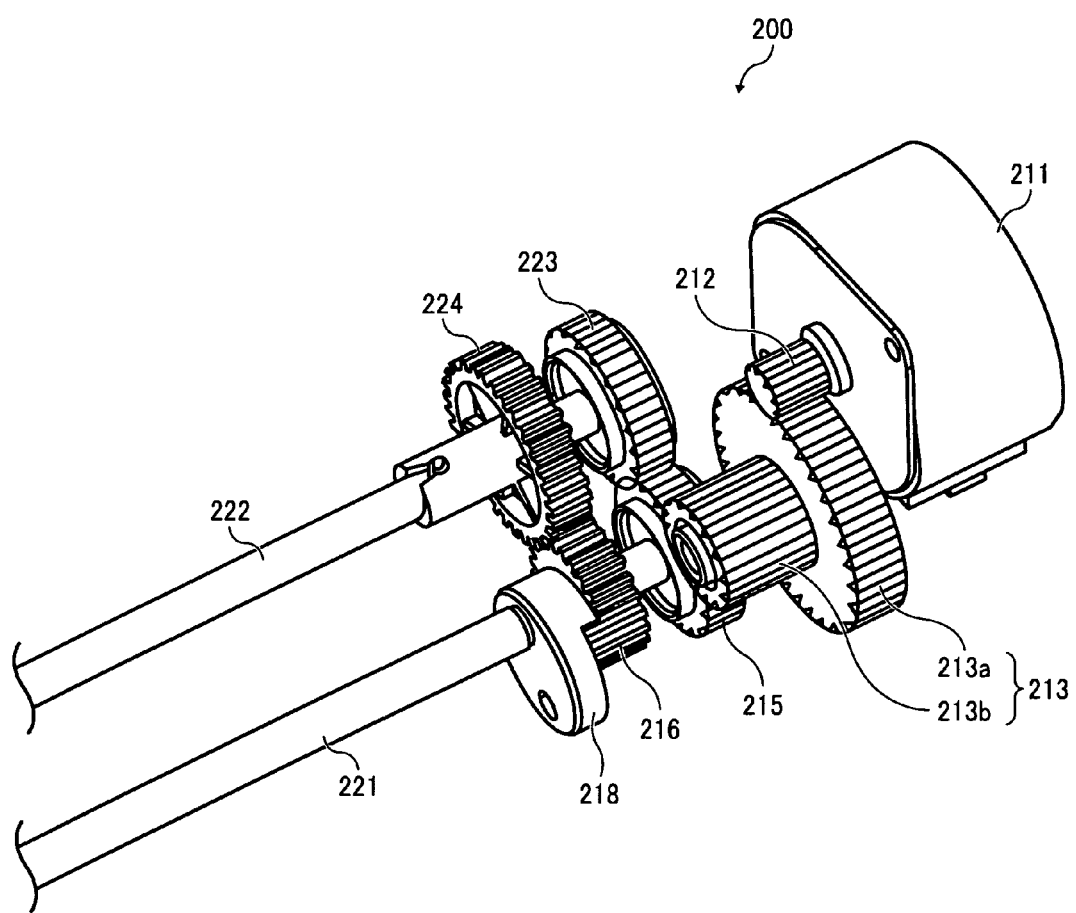
FIG. 6 is a partially enlarged view (according to an example embodiment) of the recording sheet feeder shown in FIG. 5.
Figure 7:
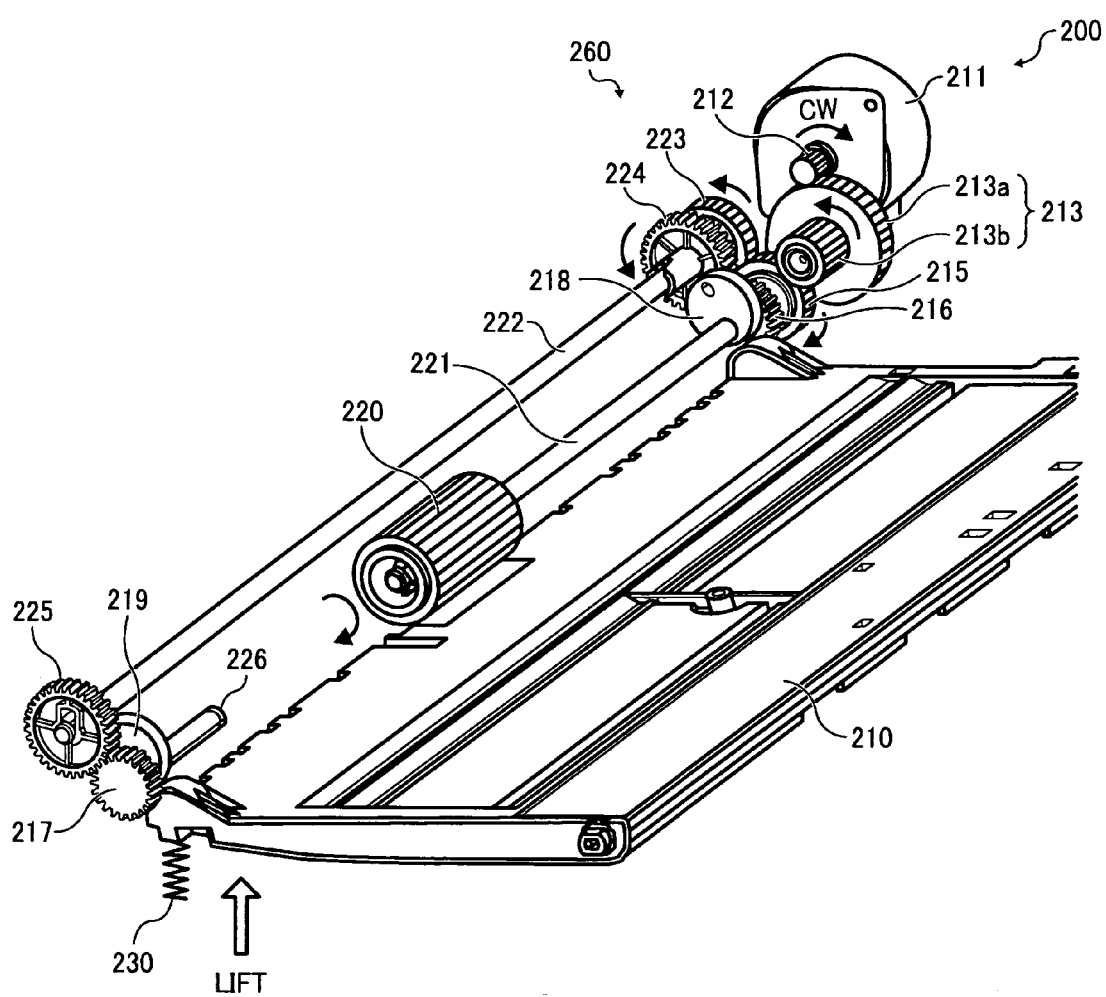
FIG. 7 is a perspective view (according to an example embodiment) of the recording sheet feeder shown in FIG. 5 when the recording sheet tray shown in FIG. 5 is lifted.

FIG. 5 is a perspective view of the recording sheet feeder 200 when the recording sheet tray 210 is lowered. FIG. 6 is a partially enlarged view of the recording sheet feeder 200. FIG. 7 is a perspective view of the recording sheet feeder 200 when the recording sheet tray 210 is lifted.

As illustrated in FIG. 5, the recording sheet feeder 200 further includes a geared one-way clutch 215, a feed roller 220, a feed roller driving shaft 221, a cam driving shaft 222, a geared one-way clutch 223, a spring 230, and/or a recording sheet tray moving mechanism 260.

The stepping motor 211 includes an output shaft 212.

The recording sheet tray moving mechanism 260 includes an idler gear 213, eccentric cam gears 216 and 217, eccentric cams 218 and 219, cam driving idler gears 224 and 225, and/or a cam support shaft 226.

The idler gear 213 includes a large diameter portion 213a and/or a small diameter portion 213b.

As illustrated in FIGS. 5 to 7, the recording sheet feeder 200 loads and feeds large recording sheets not loaded by or not contained in the paper trays 91 to 95 depicted in FIG. 1 or recording sheets including a particular material. The recording sheet feeder 200 is attached to one side of the image forming apparatus 20 depicted in FIG. 1.

In the recording sheet feeder 200, the recording sheet tray 210 loads recording sheets. The feed roller 220 feeds the recording sheets placed on the recording sheet tray 210 to an inside of the image forming apparatus 20. The spring 230, serving as a pressing member, applies pressure to the recording sheet tray 210 so that the recording sheet tray 210 is lifted to contact the feed roller 220. The eccentric cams 218 and 219, serving as first and second eccentric cams, respectively, press down the recording sheet tray 210 against the pressure applied by, the spring 230 to lower the recording sheet tray 210 and separate the recording sheet tray 210 from the feed roller 220. The stepping motor 211 serves as a driver for driving the feed roller 220 and the eccentric cams 218 and 219. A transmission mechanism transmits a driving force (e.g., a rotation force) generated by the stepping motor 211 to the feed roller 220 or the eccentric cams 218 and 219.

The transmission mechanism, which transmits the rotation force generated by the stepping motor 211 to the eccentric cams 218 and 219, includes the idler gear 213, the geared one-way clutch 215, the eccentric cam gears 216 and 217, the cam driving shaft 222, the geared one-way clutch 223, and the cam driving idler gears 224 and 225.

In the transmission mechanism, the idler gear 213 decreases a number of rotations of the stepping motor 211. The geared one-way clutch 215 engages the idler gear 213. The geared one-way clutch 223 engages the geared one-way clutch 215. The cam driving shaft 222 is connected to an output portion at a center of the geared one-way clutch 223 to rotate in a driving force transmission direction of the geared one-way clutch 223 in which the geared one-way clutch 223 transmits a driving force. The cam driving idler gears 224 and 225 are fixedly mounted on the cam driving shaft 222. The eccentric cam gears 216 and 217 engage the cam driving idler gears 224 and 225, respectively. The eccentric cams 218 and 219 are fixedly mounted on the eccentric cam gears 216 and 217, respectively.

The geared one-way clutch 223 transmits the driving force clockwise in FIG. 5 in the driving force transmission direction. For example, when the geared one-way clutch 223 rotates clockwise in FIG. 5, the cam driving shaft 222 also rotates clockwise in FIG. 5. By contrast, when the geared one-way clutch 223 rotates counterclockwise in FIG. 7, the cam driving shaft 222 does not rotate.

The geared one-way clutch 215 transmits the driving force clockwise in FIG. 5 in the driving force transmission direction. For example, when the geared one-way clutch 215 rotates clockwise in FIG. 7, the feed roller driving shaft 221 also rotates clockwise in FIG. 7. By contrast, when the geared one-way clutch 215 rotates counterclockwise in FIG. 5, the feed roller driving shaft 221 does not rotate.

The idler gear 213 serves as a reduction gear including the large diameter portion 213a and the small diameter portion 213b. The large diameter portion 213a of the idler gear 213 engages the output shaft 212 of the stepping motor 211. The small diameter portion 213b of the idler gear 213 engages the geared one-way clutch 215. The eccentric cam 218 and the eccentric cam gear 216 fixedly mounted on the eccentric cam 218 are rotatably supported by the feed roller driving shaft 221 but not fixedly mounted on the feed roller driving shaft 221. Accordingly, the eccentric cam 218 and the eccentric cam gear 216 do not transmit the driving force to the feed roller driving shaft 221.

The eccentric cam 219 and the eccentric cam gear 217 fixedly mounted on the eccentric cam 219 are fixedly mounted on the cam support shaft 226. In other words, the eccentric cams 218 and 219 are provided on a common axis but not fixedly mounted on a common rotation shaft.

When the stepping motor 211 rotates counterclockwise in FIG. 5 in a direction CCW, the idler gear 213 rotates clockwise in FIG. 5. Accordingly, the geared one-way clutch 215 rotates counterclockwise in FIG. 5, and the geared one-way clutch 223 rotates clockwise in FIG. 5. The geared one-way clutch 215, which rotates counterclockwise in FIG. 5, does not transmit a rotation force thereof to the feed roller driving shaft 221. The geared one-way-clutch 223, which rotates clockwise in FIG. 5, transmits a rotation force thereof to the cam driving shaft 222. When the cam driving shaft 222 rotates clockwise in FIG. 5, the cam driving idler gears 224 and 225 fixedly mounted on the cam driving shaft 222 rotate the eccentric cam gears 216 and 217 and the eccentric cams 218 and 219 fixedly mounted on the eccentric cam gears 216 and 217, respectively, counterclockwise in FIG. 5. The recording sheet tray 210 is lowered to a lower position shown in FIG. 5 and is lifted to an upper position shown in FIG. 7 according to rotation of the eccentric cams 218 and 219. Thus, the recording sheet tray moving mechanism 260 moves the recording sheet tray 210 between the lower position and the upper position. The recording sheet tray moving mechanism 260 includes the above-described elements for moving the recording sheet tray 210 between the lower position and the upper position.

On the other hand, a transmission mechanism, which transmits the rotation force generated by the stepping motor 211 to the feed roller 220, includes the idler gear 213, the geared one-way clutch 215, and the feed roller driving shaft 221. The idler gear 213 decreases the number of rotations of the stepping motor 211. The geared one-way clutch 215 engages the idler gear 213. The feed roller driving shaft 221 is connected to an output portion provided at a center of the geared one-way clutch 215, and rotates in the driving force transmission direction in which the geared one-way clutch 215 transmits the driving force generated by the stepping motor 211 clockwise in FIG. 7.

As illustrated in FIG. 7, when the stepping motor 211 rotates clockwise in a direction CW, the idler gear 213 rotates counterclockwise. Accordingly, the geared one-way clutch 215 rotates clockwise, and the geared one-way clutch 223 rotates counterclockwise. The geared one-way clutch 215 rotating clockwise transmits a rotation force thereof to the feed roller driving shaft 221. The geared one-way clutch 223 rotating counterclockwise does not transmit a rotation force thereof to the cam driving shaft 222. When the feed roller driving shaft 221 rotates clockwise, the feed roller 220 fixedly mounted on the feed roller driving shaft 221 rotates clockwise to feed a recording sheet placed on the recording sheet tray 210 to the inside of the image forming apparatus 20 depicted in FIG. 1.

The eccentric cam 218 is provided at one end (e.g., a rear end) of the recording sheet feeder 200 in an axial direction of the cam driving shaft 222, and the eccentric cam 219 and the spring 230 are provided at another end (e.g., a front end) of the recording sheet feeder 200. Accordingly, when the recording sheet is set on the recording sheet tray 210 lowered as illustrated in FIG. 5, height of the recording sheet is uniform in a width direction of the recording sheet, that is, a direction extending from the front end to the rear end of the recording sheet feeder 200. When the recording sheet is set on the recording sheet tray 210 lifted as illustrated in FIG. 7, height of the recording sheet tray 210 is uniform in the width direction of the recording sheet. Accordingly, height of the leading edge of the recording sheet is uniform in the width direction of the recording sheet, and therefore the recording sheet is sent from the recording sheet tray 210 to a guide provided downstream from the recording sheet tray 210 in the recording sheet conveyance direction smoothly.

In the recording sheet feeder 200, the rear eccentric cam 218 and the front eccentric cam 219 are not fixedly mounted on a common rotation shaft. Therefore, phase positioning for the two eccentric cams 218 and 219 needs to be performed smoothly to assemble the eccentric cams 218 and 219 into the recording sheet feeder 200.

The following describes a structure for performing the phase positioning for the eccentric cams 218 and 219.

Figure 8A:
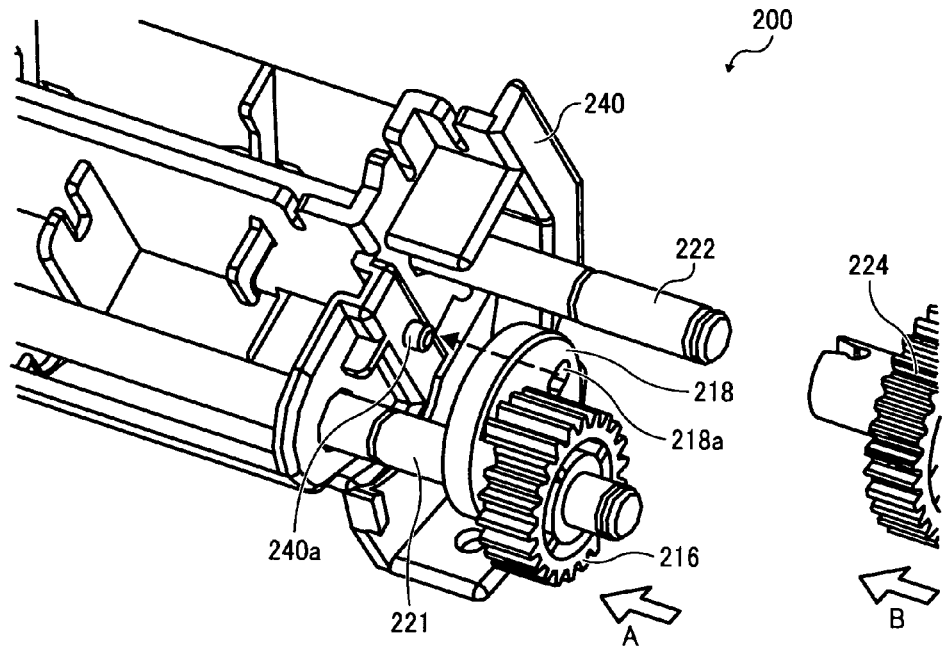
FIG. 8A is a perspective view (according to an example embodiment) of a rear end of the recording sheet feeder shown in FIG. 5.
Figure 8B:
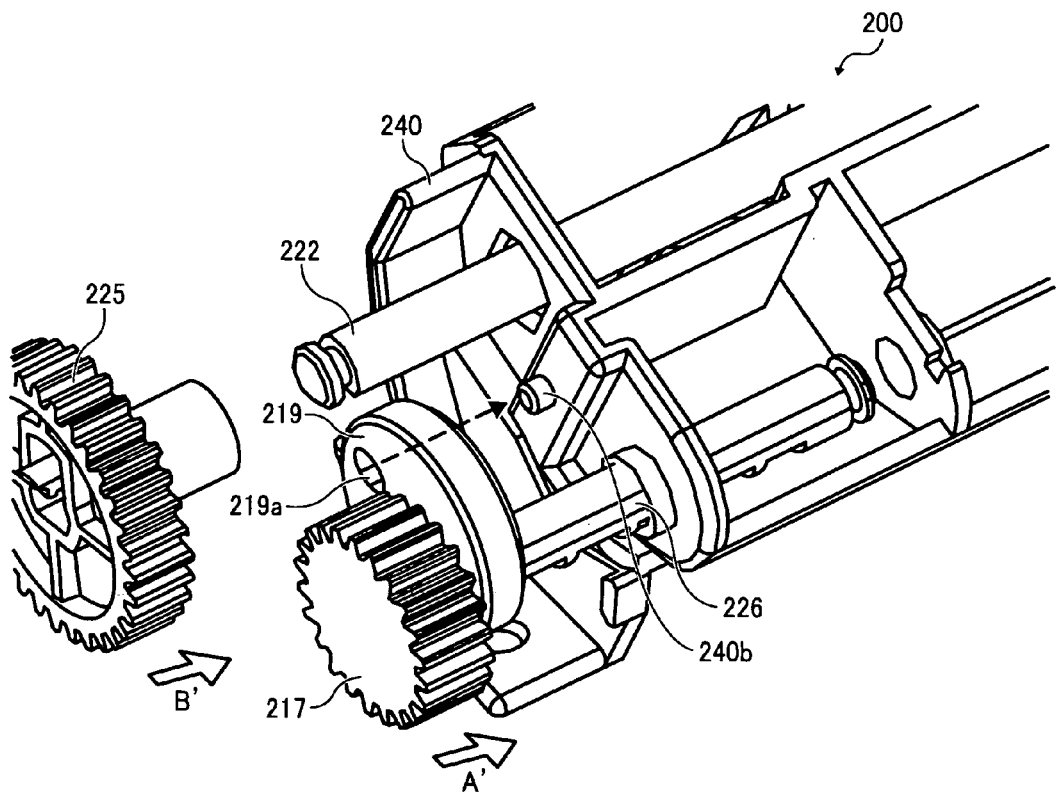
FIG. 8B is a perspective view (according to an example embodiment) of a front end of the recording sheet feeder shown in FIG. 5.
Figure 9A:
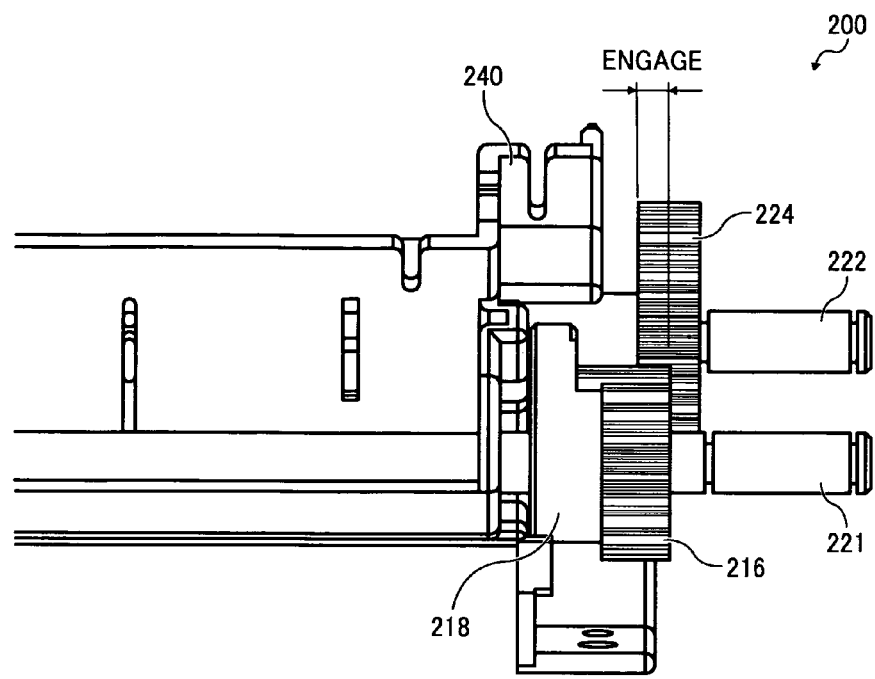
FIG. 9A is a side view (according to an example embodiment) of the rear end of the recording sheet feeder shown in FIG. 8A when an eccentric cam gear and a cam driving idler gear included in the recording sheet feeder partially engage with each other.
Figure 9B:
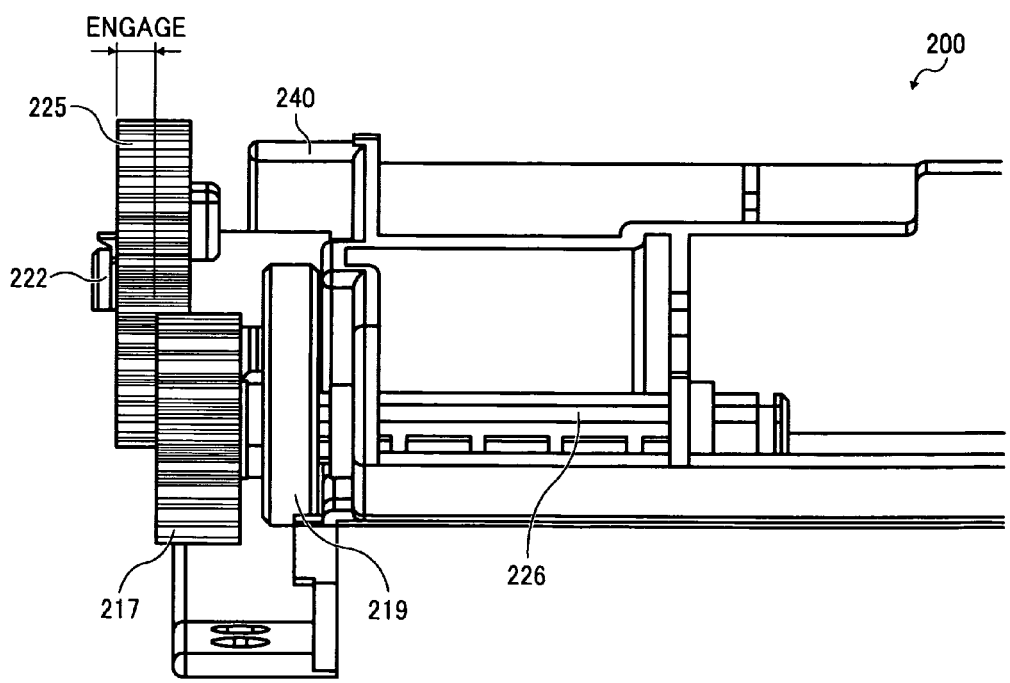
FIG. 9B is a side view (according to an example embodiment) of the front end of the recording sheet feeder shown in FIG. 8B when an eccentric cam gear and a cam driving idler gear included in the recording sheet feeder partially engage with each other.
Figure 10A:
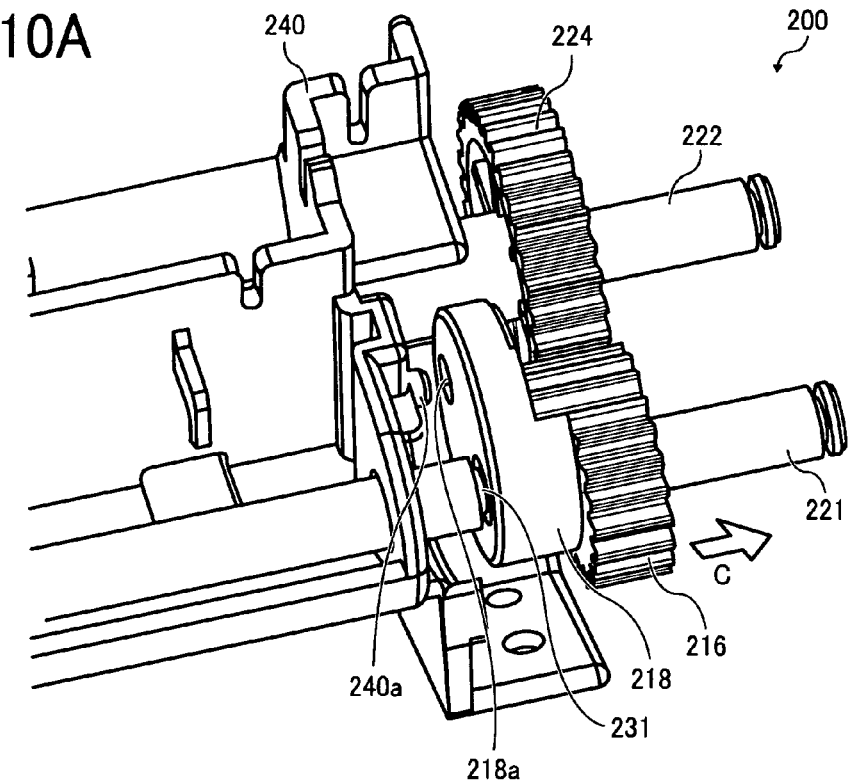
FIG. 10A is a perspective view (according to an example embodiment) of the rear end of the recording sheet feeder shown in FIG. 9A when the eccentric cam gear and the cam driving idler gear shown in FIG. 9A entirely engage with each other.
Figure 10B:
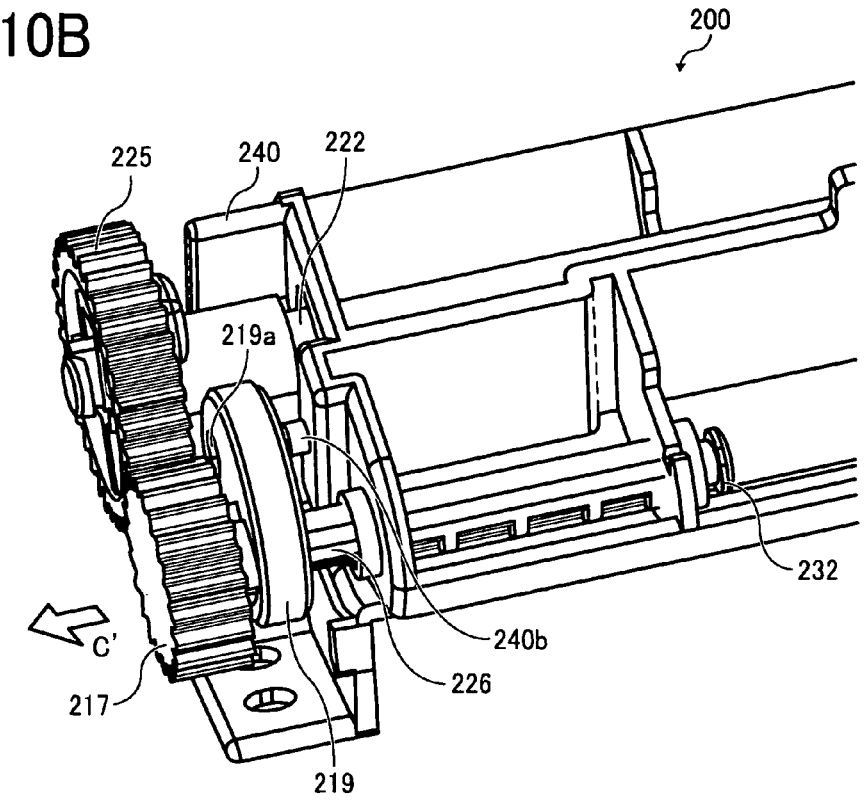
FIG. 10B is a perspective view (according to an example embodiment) of the front end of the recording sheet feeder shown in FIG. 9B when the eccentric cam gear and the cam driving idler gear shown in FIG. 9B entirely engage with each other.

FIG. 8A is a perspective view of the rear end of the recording sheet feeder 200. FIG. 8B is a perspective view of the front end of the recording sheet feeder 200. FIG. 9A is a side view of the rear end of the recording sheet feeder 200. FIG. 9B is a side view of the front end of the recording sheet feeder 200. FIG. 10A is a perspective view of the rear end of the recording sheet feeder 200. FIG. 10B is a perspective view of the front end of the recording sheet feeder 200.

As illustrated in FIG. 8A, the recording sheet feeder 200 further includes a protrusion 240a, an elongate hole 218a, and/or a unit guide board 240.

As illustrated in FIG. 8B, the recording sheet feeder 200 further includes a protrusion 240b and/or an elongate hole 219a.

As illustrated in FIG. 10A, the recording sheet feeder 200 further includes a retaining ring 231.

As illustrated in FIG. 10B, the recording sheet feeder 200 further includes a retaining ring 232.

As illustrated in FIGS. 8A, 8B, 9A, 9B, 10A, and 10B, the unit guide board 240 supports the transmission mechanisms of the recording sheet feeder 200. As illustrated in FIGS. 8A and 8B, the cylindrical protrusions 240a and 240b are provided at a rear end and a front end of the unit guide board 240, respectively, to cause a phase of the rear eccentric cam 218 to correspond to a phase of the front eccentric cam 219 when the eccentric cams 218 and 219 are assembled into the recording sheet feeder 200.

The elongate holes 218a and 219a are provided in the rear eccentric cam 218 and the front eccentric cam 219, respectively. The rear protrusion 240a and the front protrusion 240b are inserted into the rear elongate hole 218a and the front elongate hole 219a, respectively, for phase positioning of the eccentric cams 218 and 219 when the eccentric cams 218 and 219 are assembled into the recording sheet feeder 200.

As illustrated in FIG. 8A, when the eccentric cam 218 is attached to the unit guide board 240 at the rear end of the unit guide board 240, the eccentric cam 218 attached to the eccentric cam gear 216 is moved inward in a direction A so that the feed roller driving shaft 221 penetrates the eccentric cam 218 and the eccentric cam gear 216. Simultaneously, the protrusion 240a is inserted into the elongate hole 218a of the eccentric cam 218, and the cam driving idler gear 224 is moved inward in a direction B to be fixedly mounted on the cam driving shaft 222.

Consequently, the eccentric cam gear 216 engages the cam driving idler gear 224 at a part of a tooth plane as illustrated in FIG. 9A.

As illustrated in FIG. 8B, at the front end of the unit guide board 240, the eccentric cam 219 attached to the eccentric cam gear 217 and the cam support shaft 226 is moved inward in a direction A' so that the cam support shaft 226 penetrates the unit guide board 240. Simultaneously, the protrusion 240b is inserted into the elongate hole 219a of the eccentric cam 219, and the cam driving idler gear 225 is moved inward in a direction B' to be fixedly mounted on the cam driving shaft 222.

Consequently, the eccentric cam gear 217 engages the cam driving idler gear 225 at a part of a tooth plane as illustrated in FIG. 9B.

As described above, the eccentric cam 218 and the eccentric cam 219 are moved toward each other. Even when the protrusions 240a and 240b are inserted into the elongate holes 218a and 219a of the eccentric cams 218 and 219, respectively, the eccentric cam gears 216 and 217 engage the cam driving idler gears 224 and 225 at a part of the tooth plane, respectively, to maintain the phase of the eccentric cam 218 to correspond to the phase of the eccentric cam 219.

As illustrated in FIGS. 10A and 10B, after the phase of the eccentric cam 218 corresponds to the phase of the eccentric cam 219, the eccentric cam 218 and the eccentric cam gear 216 are moved outward in a direction C as illustrated in FIG. 10A, and the eccentric cam 219 and the eccentric cam gear 217 are moved outward in a direction C' as illustrated in FIG. 10B. Thus, the eccentric cams 218 and 219 are disposed at normal positions at which the eccentric cams 218 and 219 are separated apart from each other. Accordingly, the eccentric cam gear 216 engages the cam driving idler gear 224 at an entire width of the tooth plane, and the eccentric cam gear 217 engages the cam driving idler gear 225 at an entire width of the tooth plane.

As illustrated in FIG. 10A, after the eccentric cam 218 is moved to a normal position on the feed roller driving shaft 221, the retaining ring 231 is set on the feed roller driving shaft 221 to prevent the eccentric cam 218 from moving in an axial direction of the feed roller driving shaft 221. As illustrated in FIG. 10B, after the eccentric cam 219 is moved to a normal position on the cam support shaft 226, the retaining ring 232 is set on one end of the cam support shaft 226 to prevent the eccentric cam 219 from moving in an axial direction of the cam support shaft 226.

Thus, when the rear eccentric cam 218 and the front eccentric cam 219 are mounted on the unit guide board 240, phase positioning for the eccentric cams 218 and 219 is performed easily.

Figure 11:
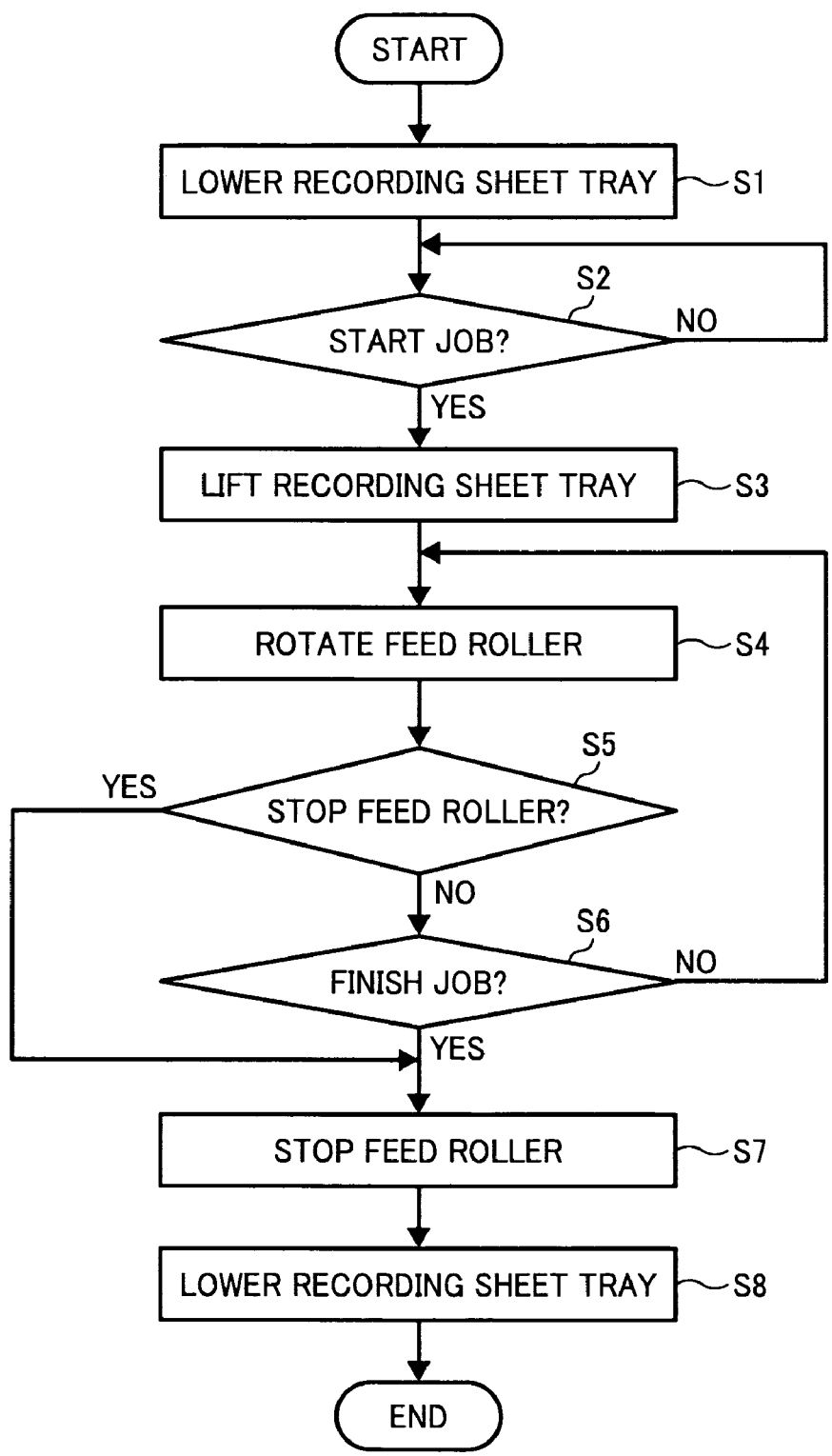
FIG. 11 is a flowchart (according to an example embodiment) illustrating operations of the recording sheet feeder shown in FIG. 5.

Referring to FIG. 11, the following describes operations of the recording sheet feeder 200 depicted in FIGS. 5 and 7. FIG. 11 is a flowchart illustrating the operations of the recording sheet feeder 200.

In step S1, when the image forming apparatus 20 (depicted in FIG. 3) is in a standby mode, that is, before the recording sheet feeder 200 (depicted in FIG. 5) starts feeding a recording sheet, the eccentric cam position sensor 250 (depicted in FIG. 3) detects a position of the eccentric cams 218 and 219 (depicted in FIG. 5), and sends a detection signal to the main controller 111 (depicted in FIG. 3). The main controller 111 rotates the stepping motor 211 (depicted in FIG. 3) counterclockwise in FIG. 5, and then stops the stepping motor 211 according to the detection signal sent from the eccentric cam position sensor 250, so as to lower the recording sheet tray 210 (depicted in FIG. 5) to the lower position shown in FIG. 5. Accordingly, the recording sheet tray 210 separates from the feed roller 220 (depicted in FIG. 5), and a user can set a recording sheet on the recording sheet tray 210 smoothly.

In step S2, the main controller 111 determines whether or not the main controller 111 receives a job start request (e.g., a print request) for starting a print job.

When the main controller 111 receives the job start request (e.g., when YES is selected in step S2), that is, when the recording sheet feeder 200 starts feeding the recording sheet, the eccentric cam position sensor 250 detects the position of the eccentric cams 218 and 219, and sends a detection signal to the main controller 111. The main controller 111 rotates the stepping motor 211 counterclockwise in FIG. 5, and then stops the stepping motor 211 according to the detection signal sent from the eccentric cam position sensor 250, so as to lift the recording sheet tray 210 to the upper position shown in FIG. 7, in step S3.

Accordingly, the feed roller 220 contacts the recording sheet set on the recording sheet tray 210, and becomes ready to feed the recording sheet.

In step S4, the main controller 111 rotates the stepping motor 211 clockwise in FIG. 7 to rotate the feed roller 220 clockwise, so that the feed roller 220 feeds the recording sheet set on the recording sheet tray 210 to the inside of the image forming apparatus 20. In step S4, the feed roller 220 can rotate for a desired time period without affecting rotation of the eccentric cams 218 and 219. For example, in order to feed a firm recording sheet such as thick paper which may slip on the feed roller 220 easily, the feed roller 220 may rotate for a longer time period than when the feed roller 220 feeds plain paper. Thus, the feed roller 220 rotating for the longer time period can address slippery of the recording sheet and therefore can reduce paper jam caused by the slippery of the recording sheet.

In step S5, the main controller 111 determines whether or not the main controller 111 receives a stop request, such as an error signal due to paper jam caused by slippery of the recording sheet on the feed roller 220.

When the main controller 111 does not receive the stop request (e.g., when NO is selected in step S5), the main controller 111 continues rotating the feed roller 220. When the main controller 111 receives the stop request (e.g., when YES is selected in step S5), the main controller 111 stops rotating the stepping motor 211 to stop rotating the feed roller 220 in step S7.

In step S8, the eccentric cam position sensor 250 detects the position of the eccentric cams 218 and 219, and sends a detection signal to the main controller 111. The main controller 111 rotates the stepping motor 211 counterclockwise, and then stops the stepping motor 211 according to the detection signal sent from the eccentric cam position sensor 250, so as to lower the recording sheet tray 210 to the lower position shown in FIG. 5.

In steps S5, S7, and S8, when the main controller 111 receives the stop request due to paper jam, all the operations of the recording sheet feeder 200 do not stop immediately. For example, the stepping motor 211 stops after the feed roller 220 separates from the recording sheet tray 210. Thus, the user can easily remove a recording sheet jammed while being fed from the recording sheet tray 210 into the inside of the image forming apparatus 20.

When the main controller 111 does not receive the stop request (e.g., when NO is selected in step S5), the main controller 111 determines whether or not the job is finished in step S6. When the job is not finished (e.g., when NO is selected in step S6), the main controller 111 continues rotating the feed roller 220. When the job is finished (e.g., when YES is selected in step S6), that is, when the main controller 111 determines to cause the recording sheet feeder 200 to finish feeding a recording sheet, the main controller 111 stops rotating the stepping motor 211 to stop rotating the feed roller 220 in step S7.

After the main controller 111 stops rotating the feed roller 220 in step S7, the eccentric cam position sensor 250 detects the position of the eccentric cams 218 and 219, and sends a detection signal to the main controller 111. The main controller 111 rotates the stepping motor 211 counterclockwise, and then stops the stepping motor 211 according to the detection signal sent from the eccentric cam position sensor 250, so as to lower the recording sheet tray 210 to the lower position shown in FIG. 5, in step S8. Accordingly, the image forming apparatus 20 enters the standby mode for waiting a next job.

Alternatively, the eccentric cam position sensor 250 may not be provided. For example, the main controller 111 may detect the position of the eccentric cams 218 and 219 based on rotation pulses generated by the stepping motor 211.

As illustrated in FIG. 5, in the recording sheet feeder 200, the recording sheet tray 210 loads a plurality of recording sheets. The spring 230, serving as a pressing member, presses up the recording sheet tray 210. The feed roller 220 is fixedly mounted axially on one end of the feed roller driving shaft 221 to feed the plurality of recording sheets loaded on the recording sheet tray 210. The recording sheet tray moving mechanism 260 moves the recording sheet tray 210 between the upper position, at which an uppermost recording sheet of the plurality of recording sheets loaded on the recording sheet tray 210 contacts the feed roller 220, and the lower position, at which the uppermost recording sheet separates from the feed roller 220. The eccentric cam 218, serving as a first eccentric cam, is rotatably mounted axially on another end of the feed roller driving shaft 221 to rotate to press down the recording sheet tray 210. The eccentric cam 219, serving as a second eccentric cam, is provided coaxial with the feed roller driving shaft 221 to rotate to press down the recording sheet tray 210. The stepping motor 211, serving as a driver, generates a driving force to drive one of the feed roller 220 and the recording sheet tray moving mechanism 260. The cam driving shaft 222, serving as a driving force transmission member, transmits the driving force generated by the stepping motor 211 from the eccentric cam 218 to the eccentric cam 219. The main controller 111 depicted in FIG. 3, serving as a controller, rotates the stepping motor 211 in one of a first direction and a second direction different from the first direction. When the stepping motor 211 rotates counterclockwise in the first direction (e.g., the direction CCW depicted in FIG. 5), the geared one-way clutches 215 and 223, serving as a driving force switch member, drive the recording sheet tray moving mechanism 260. When the stepping motor 211 rotates clockwise in the second direction (e.g., the direction CW depicted in FIG. 7), the geared one-way clutches 215 and 223 rotate the feed roller driving shaft 221.

With such a simple structure of the recording sheet feeder 200, while the recording sheet feeder 200 feeds recording sheets set on the recording sheet tray 210, the spring 230 pushes up the recording sheet tray 210 automatically as a number of the recording sheets placed on the recording sheet tray 210 decreases, even when the stepping motor 211 does not rotate counterclockwise in FIG. 5 in the first direction.

In addition to the feed roller 220, only the eccentric cam 218 and the eccentric cam gear 216 are mounted on the feed roller driving shaft 221. Accordingly, the user can replace the feed roller 220 with a new one easily. In other words, with the simple structure of the recording sheet feeder 200 providing easy maintenance for the user, switching the direction of rotation of the single stepping motor 211 can lift and lower the recording sheet tray 210 or rotate the feed roller 220.

In the recording sheet feeder 200, the geared one-way clutches 215 and 223 include a one-way clutch.

Accordingly, the geared one-way clutches 215 and 223 switch transmission of the driving force generated by the stepping motor 211 automatically. In other words, with the simple structure of the recording sheet feeder 200, switching the direction of rotation of the single stepping motor 211 can lift and lower the recording sheet tray 210 or rotate the feed roller 220.

As illustrated in FIGS. 8A and 8B, in the recording sheet feeder 200, when the eccentric cams 218 and 219 are moved toward each other, the protrusions 240a and 240b, serving as a plurality of phase match members, engage the eccentric cams 218 and 219, respectively, to cause the phase of the eccentric cam 218 to correspond to (e.g., match) the phase of the eccentric cam 219.

Accordingly, even when the eccentric cams 218 and 219 are not fixedly mounted on a single shaft, the phase of the eccentric cam 218 corresponds to the phase of the eccentric cam 219 easily when the eccentric cams 218 and 219 are assembled into the recording sheet feeder 200.

In the recording sheet feeder 200, both when the eccentric cams 218 and 219 are moved toward each other as illustrated in FIGS. 9A and 9B and when the eccentric cams 218 and 219 are moved away from each other as illustrated in FIGS. 10A and 10B, the cam driving idler gears 224 and 225 mounted on the cam driving shaft 222 engage the eccentric cam gears 216 and 217, respectively. Thus, the cam driving shaft 222 transmits the driving force generated by the stepping motor 211 from the eccentric cam 218 to the eccentric cam 219.

Accordingly, even when the eccentric cams 218 and 219 are not fixedly mounted on a single shaft, the phase of the eccentric cam 218 corresponds to the phase of the eccentric cam 219 easily when the eccentric cams 218 and 219 are assembled into the recording sheet feeder 200, preventing or reducing phase deviation.

Before the recording sheet feeder 200 starts feeding the plurality of recording sheets loaded on the recording sheet tray 210, the main controller 111 rotates the stepping motor 211 counterclockwise in FIG. 5 in the first direction to move the recording sheet tray 210 to the lower position. Thus, the main controller 111 serves as a pre-feeding controller for controlling the stepping motor 211 before the recording sheet feeder 200 starts feeding the recording sheets.

Accordingly, before the recording sheet feeder 200 starts feeding, the user can set the recording sheets onto the recording sheet tray 210 stopped at the lower position easily.

When the recording sheet feeder 200 starts feeding the plurality of recording sheets loaded on the recording sheet tray 210, the main controller 111 rotates the stepping motor 211 counterclockwise in FIG. 5 in the first direction to move the recording sheet tray 210 to the upper position, and then rotates the stepping motor 211 clockwise in FIG. 7 in the second direction to rotate the feed roller driving shaft 221. Thus, the main controller 111 serves as a feeding start controller for controlling the stepping motor 211 when the recording sheet feeder 200 starts feeding the recording sheets.

Accordingly, when the recording sheet feeder 200 starts feeding the recording sheets set on the recording sheet tray 210, the feed roller 220 rotates and feeds the recording sheets after the recording sheet tray 210 moves to the upper position. In other words, the user can set the recording sheets on the recording sheet tray 210 easily before the recording sheet tray 210 moves to the upper position. After the feed roller 220 starts rotating, the recording sheet tray 210 is not driven or moved, and therefore the feed roller 220 can feed the recording sheets smoothly without interruption.

During a feeding operation of the recording sheet feeder 200, which begins when the feed roller 220 starts feeding the plurality of recording sheets loaded on the recording sheet tray 210 and ends when the feed roller 220 finishes feeding the plurality of recording sheets, the main controller 111 continues rotating the stepping motor 211 clockwise in FIG. 7 in the second direction to rotate the feed roller driving shaft 221. Thus, the main controller 111 serves as a feeding controller for controlling the stepping motor 211 while the recording sheet feeder 200 feeds the recording sheets.

Accordingly, during the feeding operation of the recording sheet feeder 200, the recording sheet tray 210 is not driven after the feed roller 220 starts rotating. Therefore, when the recording sheet feeder 200 feeds thick recording sheets which may slip on the feed roller 220 easily and need a longer time period to be fed, the main controller 111 can continue rotating the feed roller 220 to feed the recording sheets for a desired time period.

After the recording sheet feeder 200 finishes feeding the plurality of recording sheets loaded on the recording sheet tray 210, the main controller 111 rotates the stepping motor 211 counterclockwise in FIG. 5 in the first direction to move the recording sheet tray 210 to the lower position. Thus, the main controller 111 serves as a post-feeding controller for controlling the stepping motor 211 after the recording sheet feeder 200 finishes feeding the recording sheets.

Accordingly, after the recording sheet feeder 200 finishes feeding the recording sheets set on the recording sheet tray 210, the recording sheet tray 210 moves to the lower position. Consequently, the user can place another set of recording sheets onto the recording sheet tray 210 easily.

When an error occurs while the recording sheet feeder 200 feeds the plurality of recording sheets loaded on the recording sheet tray 210, the main controller 111 stops rotating the stepping motor 211 clockwise in FIG. 7 in the second direction, and then rotates the stepping motor 211 counterclockwise in FIG. 5 in the first direction to move the recording sheet tray 210 to the lower position. Thereafter, the main controller 111 stops the stepping motor 211. Thus, the main controller 111 serves as an error controller for controlling the stepping motor 211 when an error occurs while the recording sheet feeder 200 feeds the recording sheets.

Accordingly, when an error occurs, after the feed roller 220 stops feeding the recording sheets, the recording sheet tray 210 moves to the lower position, and then the stepping motor 211 stops. Thus, the user can remove a jammed sheet from the recording sheet feeder 200 or the image forming apparatus 20 depicted in FIG. 1 easily.

The image forming apparatus 20 includes the recording sheet feeder 200, and functions as an electrophotographic copier, a laser beam printer, a facsimile machine, a multifunction printer, or the like.

In the image forming apparatus 20 including the recording sheet feeder 200, the main controller 111 switches the direction of rotation of the single stepping motor 211 to lift and lower the recording sheet tray 210 or to rotate the feed roller 220 with the simple structure.

As described above, the recording sheet feeder 200 and the image forming apparatus 20 having the simple structure providing easy maintenance can lift and lower the recording sheet tray 210 or rotate the feed roller 220 by switching the direction of rotation of the single stepping motor 211. The image forming apparatus 20 including the recording sheet feeder 200 may be used as a copier such as an electrophotographic copier, a printer such as a laser beam printer or an inkjet printer, a facsimile machine, a multifunction printer including at least one of copying, printing, and facsimile functions, or the like.

The present invention has been described above with reference to specific example embodiments. Nonetheless, the present invention is not limited to the details of example embodiments described above, but various modifications and improvements are possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A recording sheet feeder, comprising:
   a recording sheet tray to load a plurality of recording sheets;
   a pressing member to press up the recording sheet tray;
   a feed roller to feed the plurality of recording sheets loaded on the recording sheet tray;
   a feed roller driving shaft fixedly mounted axially with the feed roller on one end of the feed roller driving shaft;
   a recording sheet tray moving mechanism to move the recording sheet tray between an upper position, at which an uppermost recording sheet of the plurality of recording sheets loaded on the recording sheet tray contacts the feed roller, and a lower position, at which the uppermost recording sheet separates from the feed roller,
   the recording sheet tray moving mechanism including:
   a first eccentric cam rotatably mounted axially on another end of the feed roller driving shaft to rotate to press down the recording sheet tray; and
   a second eccentric cam provided coaxial with the feed roller driving shaft to rotate to press down the recording sheet tray;
   a driver to generate a driving force to drive one of the feed roller and the recording sheet tray moving mechanism;
   a driving force transmission member to transmit the driving force generated by the driver from the first eccentric cam to the second eccentric cam;
   a controller to rotate the driver in one of a first direction and a second direction different from the first direction; and
   a driving force switch member to drive the recording sheet tray moving mechanism when the driver rotates in the first direction, and to rotate the feed roller driving shaft when the driver rotates in the second direction.

2. The recording sheet feeder according to claim 1, wherein the driving force switch member comprises a one-way clutch.

3. The recording sheet feeder according to claim 1, further comprising:
   a plurality of phase match members to engage the first eccentric cam and the second eccentric cam, respectively,
   wherein the first eccentric cam and the second eccentric cam are movable between a first position at which a first gap is provided between the first eccentric cam and the second eccentric cam axially and a second position at which a second gap is provided between the first eccentric cam and the second eccentric cam axially, which is smaller than the first gap, and
   wherein when the first eccentric cam and the second eccentric cam are at the second position, the plurality of phase match members engages the first eccentric cam and the second eccentric cam, respectively, to cause a phase of the first eccentric cam to match a phase of the second eccentric cam.

4. The recording sheet feeder according to claim 3, wherein when the first eccentric cam and the second eccentric cam are either at the first position or at the second position, the driving force transmission member transmits the driving force from the first eccentric cam to the second eccentric cam.

5. The recording sheet feeder according to claim 1, wherein before the recording sheet feeder starts feeding the plurality of recording sheets loaded on the recording sheet tray, the controller rotates the driver in the first direction to move the recording sheet tray to the lower position.

6. The recording sheet feeder according to claim 1, wherein when the recording sheet feeder starts feeding the plurality of recording sheets loaded on the recording sheet tray, the controller rotates the driver in the first direction to move the recording sheet tray to the upper position, and then rotates the driver in the second direction to rotate the feed roller driving shaft.

7. The recording sheet feeder according to claim 1, wherein during a feeding operation of the recording sheet feeder, which begins when the feed roller starts feeding the plurality of recording sheets loaded on the recording sheet tray and ends when the feed roller finishes feeding the plurality of recording sheets, the controller continues rotating the driver in the second direction to rotate the feed roller driving shaft.

8. The recording sheet feeder according to claim 1, wherein after the recording sheet feeder finishes feeding the plurality of recording sheets loaded on the recording sheet tray, the controller rotates the driver in the first direction to move the recording sheet tray to the lower position.

9. The recording sheet feeder according to claim 1, wherein when an error occurs while the recording sheet feeder feeds the plurality of recording sheets loaded on the recording sheet tray, the controller stops rotating the driver in the second direction, rotates the driver in the first direction to move the recording sheet tray to the lower position, and then stops the driver.

10. An image forming apparatus comprising a recording sheet feeder,
    the recording sheet feeder including:
    a recording sheet tray to load a plurality of recording sheets;
    a pressing member to press up the recording sheet tray;
    a feed roller to feed the plurality of recording sheets loaded, on the recording sheet tray;
    a feed roller driving shaft fixedly mounted axially with the feed roller on one end of the feed roller driving shaft;
    a recording sheet tray moving mechanism to move the recording sheet tray between an upper position, at which an uppermost recording sheet of the plurality of recording sheets loaded on the recording sheet tray contacts the feed roller, and a lower position, at which the uppermost recording sheet separates from the feed roller,
    the recording sheet tray moving mechanism including:
    a first eccentric cam rotatably mounted axially on another end of the feed roller driving shaft to rotate to press down the recording sheet tray; and
    a second eccentric cam provided coaxial with the feed roller driving shaft to rotate to press down the recording sheet tray;
    a driver to generate a driving force to drive one of the feed roller and the recording sheet tray moving mechanism;
    a driving force transmission member to transmit the driving force generated by the driver from the first eccentric cam to the second eccentric cam;

a controller to rotate the driver in one of a first direction and a second direction different from the first direction; and a driving force switch member to drive the recording sheet tray moving mechanism when the driver rotates in the first direction, and to rotate the feed roller driving shaft when the driver rotates in the second direction.

11. The image forming apparatus according to claim 10, wherein the image forming apparatus comprises at least one of an electrophotographic copier, a laser beam printer, and a facsimile machine.

12. The image forming apparatus according to claim 10, wherein the driving force switch member of the recording sheet feeder comprises a one-way clutch.

13. The image forming apparatus according to claim 10, wherein the recording sheet feeder further comprises a plurality of phase match members to engage the first eccentric cam and the second eccentric cam, respectively, wherein the first eccentric cam and the second eccentric cam are movable between a first position at which a first gap is provided between the first eccentric cam and the second eccentric cam axially and a second position at which a second gap is provided between the first eccentric cam and the second eccentric cam axially, which is smaller than the first gap, and wherein when the first eccentric cam and the second eccentric cam are at the second position, the plurality of phase match members engages the first eccentric cam and the second eccentric cam, respectively, to cause a phase of the first eccentric cam to match a phase of the second eccentric cam.

14. The image forming apparatus according to claim 13, wherein when the first eccentric cam and the second eccentric cam are either at the first position or at the second position, the driving force transmission member transmits the driving force from the first eccentric cam to the second eccentric cam.

15. The image forming apparatus according to claim 10, wherein before the recording sheet feeder starts feeding the plurality of recording sheets loaded on the recording sheet tray, the controller rotates the driver in the first direction to move the recording sheet tray to the lower position.

16. The image forming apparatus according to claim 10, wherein when the recording sheet feeder starts feeding the plurality of recording sheets loaded on the recording sheet tray, the controller rotates the driver in the first direction to move the recording sheet tray to the upper position, and then rotates the driver in the second direction to rotate the feed roller driving shaft.

17. The image forming apparatus according to claim 10, wherein during a feeding operation of the recording sheet feeder, which begins when the feed roller starts feeding the plurality of recording sheets loaded on the recording sheet tray and ends when the feed roller finishes feeding the plurality of recording sheets, the controller continues rotating the driver in the second direction to rotate the feed roller driving shaft.

18. The image forming apparatus according to claim 10, wherein after the recording sheet feeder finishes feeding the plurality of recording sheets loaded on the recording sheet tray, the controller rotates the driver in the first direction to move the recording sheet tray to the lower position.

19. The image forming apparatus according to claim 10, wherein when an error occurs while the recording sheet feeder feeds the plurality of recording sheets loaded on the recording sheet tray, the controller stops rotating the driver in the second direction, rotates the driver in the first direction to move the recording sheet tray to the lower position, and then stops the driver.

* * * * *